US011274567B2

(12) United States Patent
Vetters et al.

(10) Patent No.: US 11,274,567 B2
(45) Date of Patent: Mar. 15, 2022

(54) KEYSTONED BLADE TRACK

(71) Applicants: Rolls-Royce North American Technologies, Inc., Indianapolis, IN (US); Rolls-Royce Corporation, Indianapolis, IN (US); Rolls-Royce plc, London (GB)

(72) Inventors: Daniel K. Vetters, Indianapolis, IN (US); Aaron D. Sippel, Zionsville, IN (US); David J. Thomas, Brownsburg, IN (US); Andrew J. Eifert, Indianapolis, IN (US); Paul A. Davis, Bristol (GB); Simon L. Jones, Bristol (GB); Peter Broadhead, Derby (GB); Bruce E. Varney, Greenwood, IN (US); Jeffrey A. Walston, Indianapolis, IN (US); Steven Hillier, Manchester (GB)

(73) Assignees: Rolls-Royce North American Technologies Inc., Indianapolis, IN (US); Rolls-Royce Corporation, Indianapolis, IN (US)

( * ) Notice: Subject to any disclaimer, the term of this patent is extended or adjusted under 35 U.S.C. 154(b) by 387 days.

(21) Appl. No.: 16/385,725

(22) Filed: Apr. 16, 2019

(65) Prior Publication Data
US 2019/0242268 A1 Aug. 8, 2019

Related U.S. Application Data

(63) Continuation of application No. 15/090,134, filed on Apr. 4, 2016, now Pat. No. 10,563,535.
(Continued)

(51) Int. Cl.
F01D 11/18 (2006.01)
F01D 11/12 (2006.01)
(Continued)

(52) U.S. Cl.
CPC ............ *F01D 11/122* (2013.01); *C04B 35/01* (2013.01); *C04B 35/565* (2013.01); *C04B 35/80* (2013.01);
(Continued)

(58) Field of Classification Search
None
See application file for complete search history.

(56) References Cited

U.S. PATENT DOCUMENTS 4,596,116 A * 6/1986 Mandet ................... F01D 11/24
60/785
5,104,287 A 4/1992 Ciokajlo
(Continued)

FOREIGN PATENT DOCUMENTS

DE 102008044450 A1 2/2009
EP 2589774 A1 5/2013
(Continued)

OTHER PUBLICATIONS

Corman, Gregory S. and Luthra, Krishan L.; Melt Infiltrated Ceramic Composites (HIPERCOMP®) for Gas Turbine Engine Applications; DOE/CE/41000-3; May 1994-Sep. 2005; pp. 1-507.
(Continued)

*Primary Examiner* — Kayla Mccaffrey
(74) *Attorney, Agent, or Firm* — Barnes & Thornburg LLP

(57) ABSTRACT

A blade track for a gas turbine engine includes a plurality of blade track segments. The blade track segments are arranged circumferentially around a central axis to form the blade track.

20 Claims, 14 Drawing Sheets

Related U.S. Application Data

(60) Provisional application No. 62/154,461, filed on Apr. 29, 2015, provisional application No. 62/154,400, filed on Apr. 29, 2015.

(51) Int. Cl.
| | | |
|---|---|---|
| *C04B 35/83* | (2006.01) | |
| *C04B 35/01* | (2006.01) | |
| *C04B 35/565* | (2006.01) | |
| *C04B 35/80* | (2006.01) | |
| *F01D 25/12* | (2006.01) | |
| *F01D 25/00* | (2006.01) | |
| *F04D 29/16* | (2006.01) | |
| *F04D 29/52* | (2006.01) | |

(52) U.S. Cl.
CPC .............. *C04B 35/83* (2013.01); *F01D 11/12* (2013.01); *F01D 25/005* (2013.01); *F01D 25/12* (2013.01); *F04D 29/164* (2013.01); *F04D 29/526* (2013.01); *C04B 2235/5252* (2013.01); *C04B 2235/94* (2013.01); *F05D 2220/32* (2013.01); *F05D 2230/60* (2013.01); *F05D 2240/11* (2013.01); *F05D 2240/55* (2013.01); *F05D 2260/22141* (2013.01); *F05D 2260/52* (2013.01); *F05D 2300/6033* (2013.01); *Y02T 50/60* (2013.01)

(56) References Cited

U.S. PATENT DOCUMENTS

| | | | | |
|---|---|---|---|---|
| 6,113,349 A | * | 9/2000 | Bagepalli | ................ F01D 11/08 415/135 |
| 6,932,566 B2 | * | 8/2005 | Suzumura | ............... F01D 11/08 415/135 |
| 7,771,160 B2 | * | 8/2010 | Shi | ........................... F01D 9/04 415/138 |
| 8,167,546 B2 | | 5/2012 | Shi et al. | |
| 8,496,431 B2 | | 7/2013 | Habarou et al. | |
| 8,511,975 B2 | | 8/2013 | Shi et al. | |
| 8,684,689 B2 | | 4/2014 | Guo et al. | |
| 8,801,372 B2 | * | 8/2014 | Shi | ......................... F01D 25/12 415/173.1 |
| 8,834,106 B2 | | 9/2014 | Luczak | |
| 2004/0047726 A1 | | 3/2004 | Morrison | |
| 2010/0150703 A1 | | 6/2010 | Gonzalez et al. | |
| 2012/0156029 A1 | | 6/2012 | Karafillis et al. | |
| 2012/0301269 A1 | | 11/2012 | Alvanos et al. | |
| 2013/0011248 A1 | | 1/2013 | Croteau et al. | |
| 2014/0202168 A1 | | 7/2014 | Shapiro et al. | |
| 2014/0328672 A1 | * | 11/2014 | Brandl | ...................... F01D 9/04 415/139 |

FOREIGN PATENT DOCUMENTS

| | | |
|---|---|---|
| FR | 2980235 B1 | 4/2015 |
| GB | 2235730 A | 3/1991 |
| GB | 2468768 A | 9/2010 |
| WO | 2010058137 A1 | 5/2010 |

OTHER PUBLICATIONS

Extended European Search Report, European Application No. 16164265.7-1610, dated Sep. 30, 2016, 7 pages.

Extended European Search Report, European Application No. 16165824.0-1610, dated Sep. 30, 2016, 7 pages.

* cited by examiner

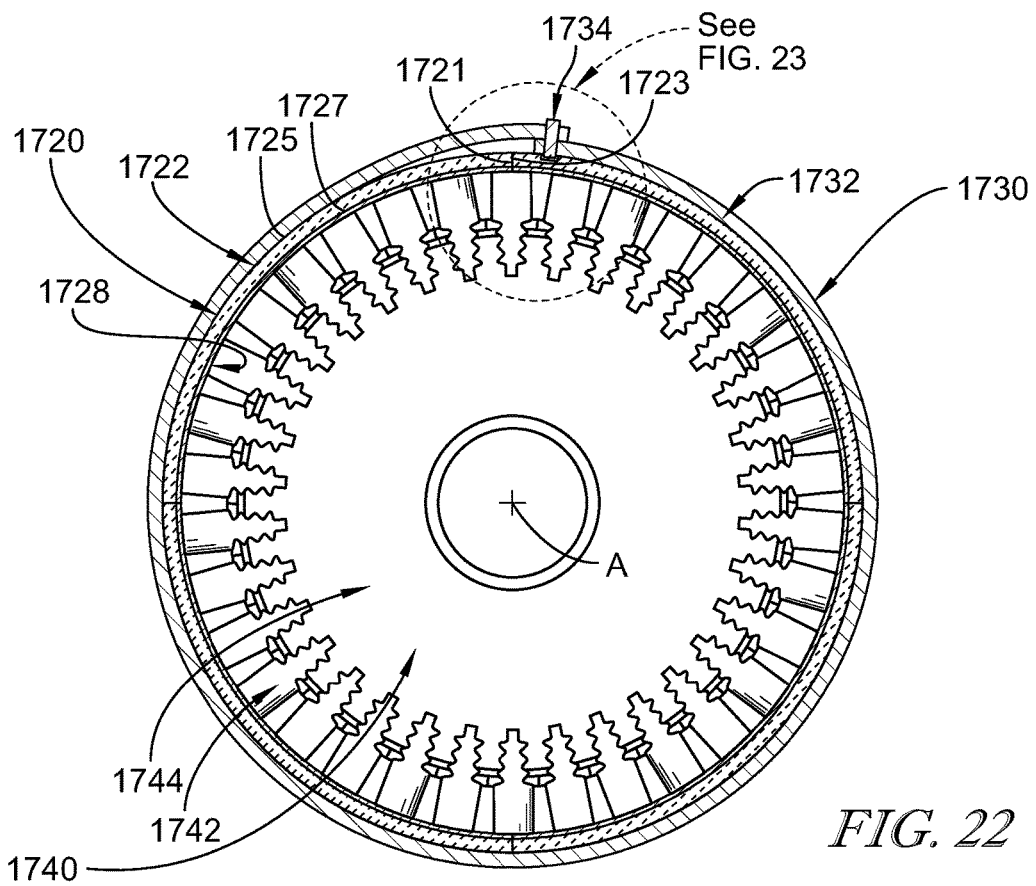
FIG. 22
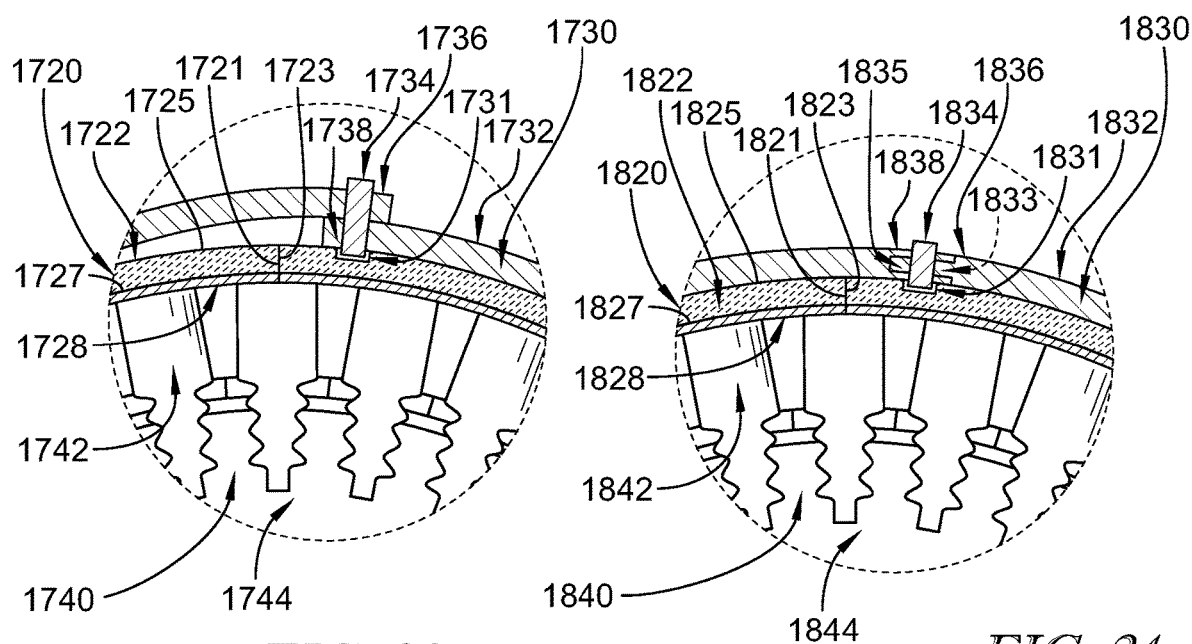
FIG. 23
FIG. 24

KEYSTONED BLADE TRACK

CROSS REFERENCE TO RELATED APPLICATIONS

This application is a continuation of U.S. patent application Ser. No. 15/090,134, filed 4 Apr. 2016 which claims priority to and the benefit of U.S. Provisional Patent Application No. 62/154,400, filed 29 Apr. 2015 and U.S. Provisional Patent Application No. 62/154,461, filed 29 Apr. 2015, the disclosures of which are now expressly incorporated herein by reference.

FIELD OF THE DISCLOSURE

The present disclosure relates generally to gas turbine engines, and more specifically to ceramic-containing composite blade tracks used in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Compressors and turbines typically include alternating stages of static vane assemblies and rotating wheel assemblies that perform work on or extract work from gasses moving through a primary gas path of the engine. The rotating wheel assemblies include disks carrying blades around their outer edges. When the rotating wheel assemblies turn, tips of the blades move along blade tracks that are arranged around the rotating wheel assemblies. Such blade tracks are adapted to reduce the leakage of gas over the blades without interaction with the blades. The blade tracks may also be designed to minimize leakage of gas into or out of the primary gas path.

SUMMARY

The present disclosure may comprise one or more of the following features and combinations thereof.

According to the present disclosure, a blade track for a gas turbine engine may include a plurality of blade track segments and a composite-lock structure. The blade track segments may comprise ceramic-matrix composite materials and may be shaped to extend part-way around a central axis. Each blade track segment may include opposing circumferential end faces and a radially outer surface extending between the end faces. The composite-lock structure may be positioned to engage the outer surfaces of the blade track segments. The composite-lock structure may include at least one reinforcement fiber of ceramic-containing material suspended in ceramic-matrix material.

In illustrative embodiments, the blade track segments may be positioned circumferentially around the central axis to form a ring. The end faces of the blade track segments may be engaged with one another. The composite-lock structure may be configured to provide a radially-inward force toward the central axis against the blade track segments such that each blade track segment acts as a keystone to maintain the form of the ring.

In illustrative embodiments, the at least one reinforcement fiber may be positioned to circumferentially surround the ring along the outer surfaces of the blade track segments.

In illustrative embodiments, the at least one reinforcement fiber may be a single continuous fiber that extends around the ring at least twice.

In illustrative embodiments, the at least one reinforcement fiber may include a plurality of fibers.

In illustrative embodiments, each of the blade track segments may further include a runner and a pair of flanges that extend radially outward from the outer surface of the runner to form a radially-outward opening lock-receiving channel with the runner that receives at least a portion of the composite-lock structure.

In illustrative embodiments, a first one of the pair of flanges may extend outwardly in the radial direction along an axially-forward face of the runner to form a generally continuous axially-forward face of the blade track segment.

In illustrative embodiments, a second one of the pair of flanges may extend outwardly in the radial direction along an axially-aft face of the runner to form a generally continuous axially-aft face of the blade track segment.

In illustrative embodiments, the end faces of the blade track segments may be configured to engage and form a resultant radially-outward force away from the central axis against the composite-lock structure.

In illustrative embodiments, the end faces may extend radially inward from the outer surface and may be positioned to lie in a plane defined in part by the central axis.

According to the present disclosure, a method of assembling a blade track for use in a gas turbine engine may include positioning a plurality of blade track segments circumferentially around a central axis, each blade track segment including opposing circumferential end faces and a radially outer surface extending between the end faces, engaging the end faces of adjacent blade track segments together to form a ring of blade track segments, and forming a composite-lock structure along the outer surfaces of the blade track segments. Each blade track segment may comprise ceramic-matrix composite materials and may be shaped to extend part-way around the central axis. The composite-lock structure may comprise ceramic-matrix composite materials. The composite-lock structure may be configured to provide a radially inward force against the blade track segments such that each blade track segment acts as a keystone to maintain the form of the ring.

In illustrative embodiments, forming the composite-lock structure may include positioning at least one reinforcement fiber of ceramic-containing material along the outer surfaces of the blade track segments and suspending the at least one reinforcement fiber in ceramic-matrix material.

In illustrative embodiments, suspending the at least one reinforcement fiber in ceramic-matrix material may include infiltrating the at least one reinforcement fiber with the ceramic-matrix material and solidifying the ceramic-matrix material to form a ceramic-matrix composite structure.

In illustrative embodiments, the at least one reinforcement fiber may be infiltrated using at least one of a slurry infiltration process or melt infiltration process.

In illustrative embodiments, the at least one reinforcement fiber may be a single continuous fiber.

In illustrative embodiments, the method may further include wrapping the fiber around the ring along the outer surfaces of the blade tracks at least once.

In illustrative embodiments, the method may further include wrapping the fiber around the ring along the outer surfaces of the blade tracks at least twice.

According to the present disclosure, a method of forming a blade track for use in a gas turbine engine may include forming a plurality of blade track segments from ceramic-matrix composite materials, arranging the blade track segments in a ring, and forming a composite-lock structure from ceramic-matrix composite materials along radially outer surfaces of the blade track segments. The composite-lock structure may be configured to provide a radially inward force against the blade track segments such that each blade track segment acts as a keystone to maintain the form of the ring.

In illustrative embodiments, forming the composite-lock structure may include wrapping a single continuous fiber of ceramic-containing material along the outer surfaces of the blade track segments at least once and suspending the at least reinforcement one fiber in ceramic-matrix material.

In illustrative embodiments, suspending the at least one reinforcement fiber in ceramic-matrix material may include infiltrating the at least one reinforcement fiber with the ceramic-matrix material and solidifying the ceramic-matrix material to form a ceramic-matrix composite structure.

In illustrative embodiments, the method may further include wrapping the fiber around the ring along the outer surfaces of the blade tracks at least twice.

According to another aspect of the present disclosure, a blade-track system for a gas turbine engine may include a blade track and a track biaser positioned to surround the blade track. The blade track may include a plurality of blade track segments positioned circumferentially around a central axis to form a ring. Each blade track segment may comprise ceramic-matrix composite materials and may be shaped to extend part-way around the central axis. Each blade track segment may include opposing circumferential end faces and a radially outer surface extending between the end faces. The end faces of the blade track segments may be engaged with one another and the track biaser may be configured to provide means for radially biasing the blade track segments toward the central axis such that each blade track segment acts as a keystone to maintain the form of the ring.

In illustrative embodiments, the end faces of the blade track segments may be configured to engage and form a resultant radially-outward force away from the central axis against the track biaser.

In illustrative embodiments, the track biaser may be positioned to engage the blade track segments to provide a radially-inward force against the blade track segments.

In illustrative embodiments, the track biaser may include at least one unitary ring sized to surround the blade track and engage the outer surfaces of the blade track segments.

In illustrative embodiments, the at least one unitary ring may include a first unitary ring substantially aligned with an axially-forward face of the blade track segments and a second unitary ring substantially aligned with an axially-aft face of the blade track segments.

In illustrative embodiments, each of the blade track segments may further include a first bevel surface extending between the axially-forward face and the outer surface and a second bevel surface extending between the axially-aft face and the outer surface. The first and second bevel surfaces may be angled radially inward relative to the outer surface. The first and second rings may be configured to engage the first and second bevel surfaces to provide the radially-inward force.

In illustrative embodiments, the blade-track system may further include springs positioned to bias the first and second rings toward one another.

In illustrative embodiments, the blade-track system may further include spacers positioned between the springs and the first and second rings.

In illustrative embodiments, the track biaser may further include a plurality of outer fins extending radially outward from and circumferentially along the at least one unitary ring. The fins may be spaced apart from one another to define cooling channels.

In illustrative embodiments, the blade-track system may further include a heat-transfer layer positioned between the at least one unitary ring and the blade track.

In illustrative embodiments, the blade track may further include a plurality of inner fins extending radially inward from and circumferentially along the at least one unitary ring. The inner fins may be spaced apart from one another to define insulation-receiving channels.

In illustrative embodiments, the blade-track system may further include an insulative material positioned within the insulation-receiving channels between the at least one unitary ring and the blade track.

In illustrative embodiments, the track biaser may include at least one band having first and second ends and sized to surround the blade track to engage the outer surfaces of the blade track segments.

In illustrative embodiments, the track biaser may further include a pin extending through the first and second ends of the band to couple the first end to the second end.

In illustrative embodiments, one of the first end and second end may be positioned radially outward of the other one of the first end and second end.

In illustrative embodiments, the pin may extend radially through the first and second ends and into a recess formed in the blade track.

In illustrative embodiments, the first end may be formed to include a tab and the second end is formed to include a slot sized to receive the tab.

In illustrative embodiments, the pin may extend radially through the first and second ends and into a recess formed in the blade track.

In illustrative embodiments, the pin may extend axially through the first and second ends.

In illustrative embodiments, each of the blade track segments may further include a runner and a pair of flanges that extend radially outward from the outer surface of the blade track segment and along the end faces.

In illustrative embodiments, the track biaser may be sized and positioned to contact the flanges.

In illustrative embodiments, the flanges may be spaced apart from the end faces on the outer surface of the blade track segments.

In illustrative embodiments, the flanges may at least partially define the end faces of the blade track segments.

In illustrative embodiments, the flanges may each include a first end coupled to the runner and a second end spaced from the first end. The second ends of adjacent blade track segments may engage with one another.

In illustrative embodiments, the flanges of adjacent blade track segments may cooperate to form an air gap between the flanges.

In illustrative embodiments, the flanges of adjacent blade track segments may cooperate to form an insulator receiver between the flanges.

In illustrative embodiments, the blade-track system may further include an insulative material positioned within the insulator receiver.

In illustrative embodiments, each of the blade track segments may further include a runner and a pair of flanges that extend radially outward from the outer surface of the blade track segment and along the end faces.

In illustrative embodiments, the track biaser may include a plurality of air-flow heads and a plurality of ring segments coupled between the air-flow heads such that the track biaser surrounds the blade track.

In illustrative embodiments, the ring segments may be radially spaced apart from the runners of the blade track segments to define an air gap.

In illustrative embodiments, the air-flow heads may be formed to include at least one cooling-air plenum and at least one hole in fluid communication with the air gap and cooling-air plenum.

In illustrative embodiments, the air-flow heads may be further formed to include a recess sized to receive mating flanges of an adjacent pair of blade track segments.

In illustrative embodiments, the air-flow heads may be configured to pass cooling air from the cooling-air plenum into the air gap to pressurize a space between the track biaser and the blade track to provide a radially-inward force on the blade track segments.

In illustrative embodiments, the track biaser may include a ring sized to surround the blade track and a plurality of wave springs positioned between the ring and the blade track.

In illustrative embodiments, each wave spring may include a first end and a second end spaced apart from the first end. The first end may be biased toward the second end.

In illustrative embodiments, the ring may be formed to include a plurality of recesses and wherein the first ends of the wave springs are positioned in the recesses.

In illustrative embodiments, each wave spring may further include a plurality of peaks configured to contact the ring and a plurality of valleys configured to contact the blade track segments. The peaks and valleys may be positioned between the first and second ends of the wave springs.

In illustrative embodiments, the blade track segments of the blade track may be co-processed such the blade track segments are coupled together.

These and other features of the present disclosure will become more apparent from the following description of the illustrative embodiments.

BRIEF DESCRIPTION OF THE DRAWINGS

FIG. 22 is a view similar to FIG. 12 showing a blade track including a plurality of blade track segments positioned to surround the turbine wheel assembly of the turbine and another embodiment of a track biaser in accordance with the present disclosure positioned to bias the blade track segments radially inward toward a central axis of the gas turbine engine;

FIG. 23 is a detail view of the track biaser of FIG. 22 showing that the track biaser includes a metallic band positioned to surround the blade track segments and a radially-extending pin coupled between stacked, opposing ends of the band and suggesting that the band engages with a radially outer surface of the blade track segments to provide a radially inward force that holds the blade track segments together;

FIG. 24 is a view similar to FIG. 23 showing that another embodiment of a track biaser in accordance with the present disclosure includes a metallic band positioned to surround the blade track segments and a radially-extending pin coupled between fitted, opposing ends of the band and suggesting that the band engages with a radially outer surface of the blade track segments to provide a radially inward force that holds the blade track segments together;

DETAILED DESCRIPTION OF THE DRAWINGS

Figure 1:
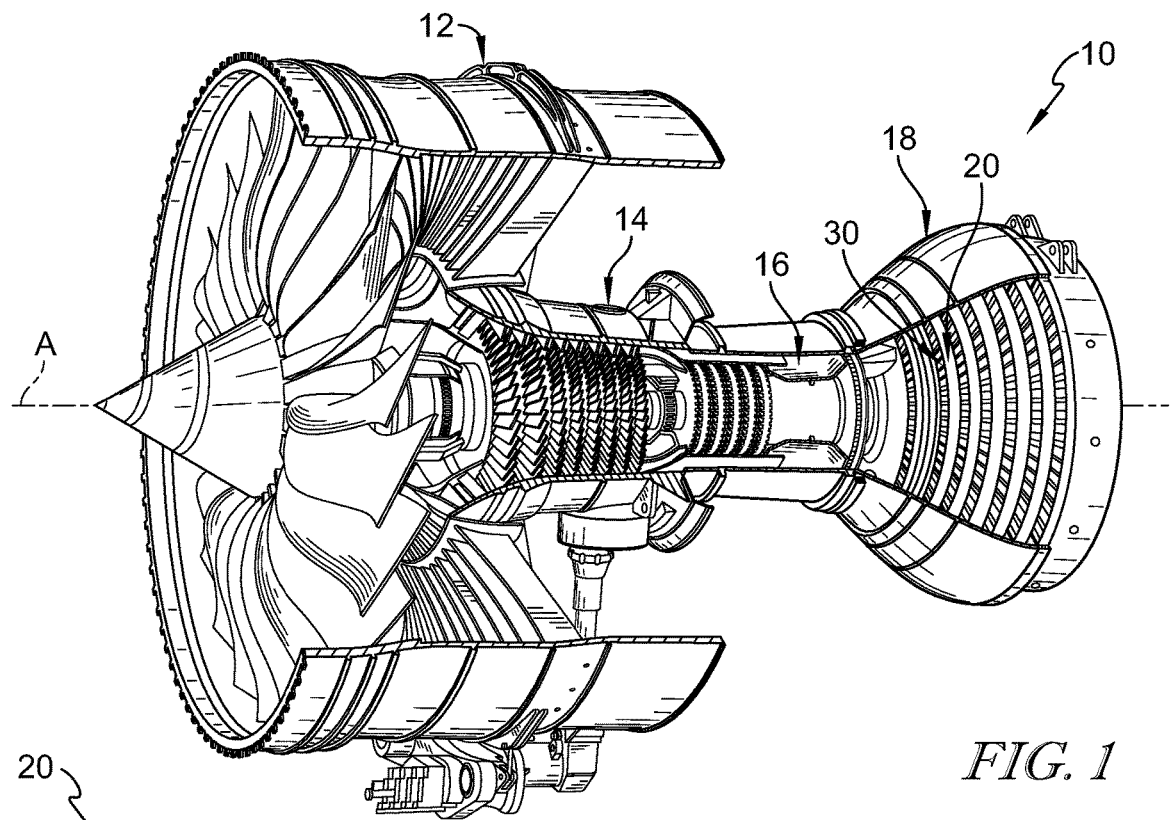
FIG. 1 is a perspective view of a gas turbine engine cut away to show that the engine includes a fan, a compressor, a combustor, and a turbine.

For the purposes of promoting an understanding of the principles of the disclosure, reference will now be made to a number of illustrative embodiments illustrated in the drawings and specific language will be used to describe the same.

FIG. 1 shows an illustrative aerospace gas turbine engine 10 cut-away to show that the engine 10 includes a fan 12, a compressor 14, a combustor 16, and a turbine 18. The fan 12 pushes air through the engine 10 to propel an aircraft. The compressor 14 compresses and delivers air to the combustor 16. The combustor 16 mixes fuel with the compressed air received from the compressor 14 and ignites the fuel. The hot, high pressure products of the combustion reaction in the combustor 16 are directed into the turbine 18 and the turbine 18 extracts work to drive the compressor 14 and the fan 12.

Figure 4:
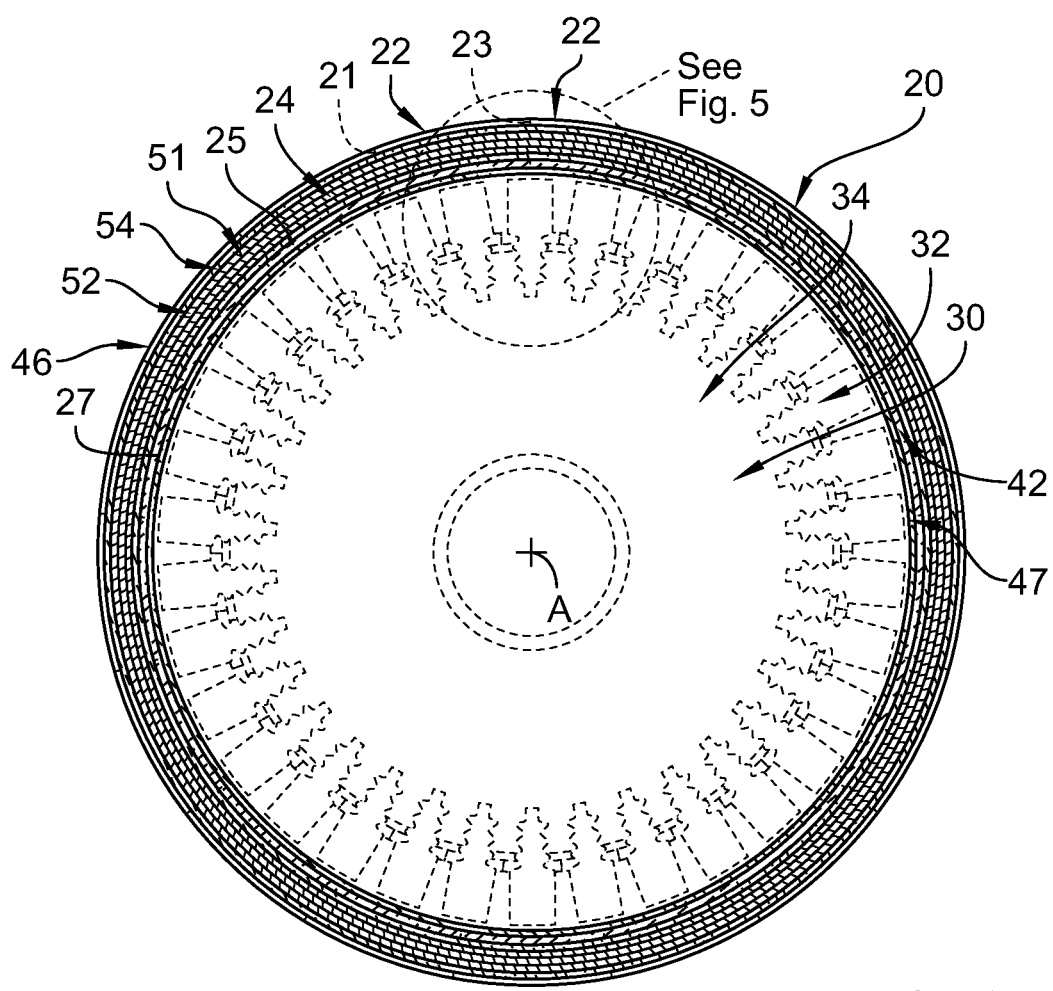
FIG. 4 is a sectional view of the blade track of FIG. 2 taken along line 4-4 showing the blade track surrounding blades of a turbine wheel and suggesting that the fiber wrap is formed from a continuous fiber of ceramic-containing material wrapped around the ring of blade track segments.

The turbine 18 illustratively includes at least one turbine wheel assembly 30 and a blade track 20 positioned to surround the turbine wheel assembly 30 as shown in FIGS. 1 and 4. The turbine wheel assembly 30 includes a plurality of blades 32 coupled to a rotor disk 34 for rotation therewith. The hot, high pressure combustion products from the combustor 16 are directed toward the blades 32 of the turbine wheel assemblies 30. The blades 32 are in turn pushed by the combustion products to cause the turbine wheel assembly 30 to rotate; thereby, driving the rotating components of the compressor 14 and/or the fan 12.

Figure 2:
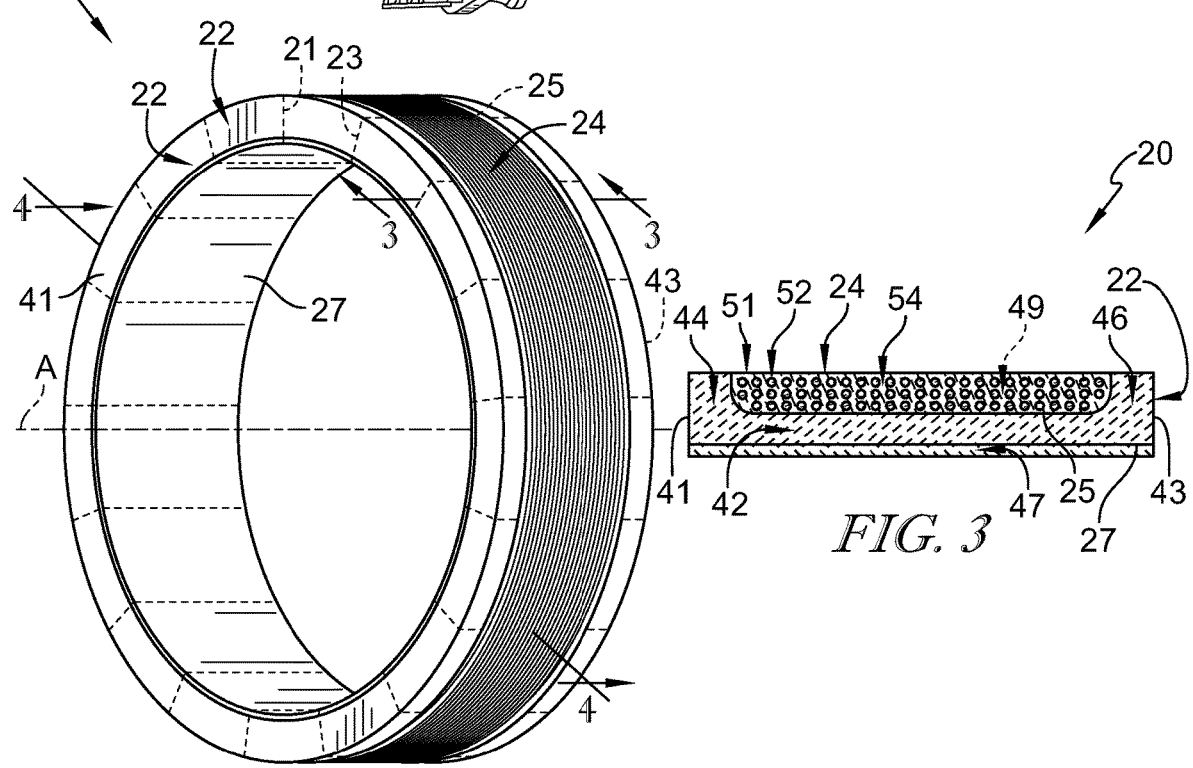
FIG. 2 is a perspective view of a blade track adapted for use in the turbine of the gas turbine engine of FIG. 1 to block hot gasses from passing over blades of a turbine wheel showing that the blade track includes a plurality of blade track segments arranged circumferentially adjacent to one another and a fiber wrap extending around the segments to provide a composite-lock structure that holds the blade track segments in a ring.

The blade track 20 extends around the turbine wheel assembly 30 to block combustion products from passing over the blades 32 without pushing the blades 32 to rotate as suggested in FIG. 4. The blade track 20 includes a plurality of blade track segments 22 that cooperate to form a ring and a composite-lock structure 24 integrated with the blade track segments 22 as shown in FIG. 2. The blade track segments 22 are each shaped to extend part-way around a central axis A and comprise ceramic-matrix composite materials. The composite-lock structure 24 illustratively includes a matrix-infiltrated fiber wrap 51 that extends around the blade track segments 22 and that is integrated with the blade track segments 22 to form a full hoop blade track 20.

Each of the blade track segments 22 includes opposing circumferential end faces 21, 23 and a radially outer surface 25 extending between the end faces 21, 23 as shown in FIG. 2. The blade track segments 22 are positioned circumferentially around the central axis A to form a substantially continuous ring and the composite-lock structure 24 is positioned to engage the outer surfaces 25 of the blade track segments 22 to maintain the shape of the blade track 20. Each blade track segment 22 is illustratively made from silicon-carbide, silicon-carbide ceramic-matrix composite, but may be made from oxide, oxide ceramic-matrix composite or the like.

In the illustrative embodiment, the end faces 21, 23 extend radially inward from the outer surface 25 and are positioned to lie in a plane defined in part by the central axis A as suggested in FIG. 2. The composite-lock structure 24 is configured to provide a radially-inward force toward the central axis A against the blade track segments 22. The end faces 21, 23 of adjacent blade track segments 22 engage with one another to provide an opposing radially-outward force away from the central axis A and against the composite-lock structure 24. As such, each blade track segment 22 acts as a keystone for circumferentially-adjacent blade track segments 22 to maintain the form of the blade track 20. The composite-lock structure 24 maintains alignment of the blade track segments 22 in the ring.

Radially-inward loads placed on the blade track 20 are distributed through the blade track segments 22 as compressive hoop load as suggested in FIG. 2. Radially-outward loads placed on the blade track 20 are distributed through the composite-lock structure 24 as tensile hoop load. In some embodiments, engagement between the end faces 21, 23 forms a seal between adjacent blade track segments 22. In some embodiments, the blade track segments 22 are integrally joined through co-processing, welding, or brazing, for example, to form a seal between adjacent blade track segments 22.

Figure 3:
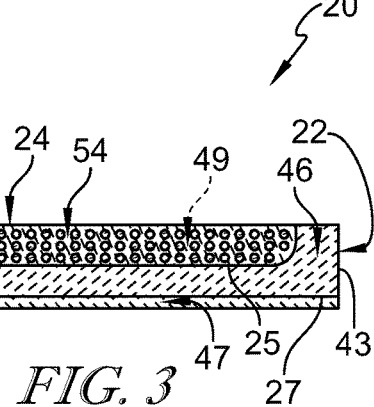
FIG. 3 is a sectional view of the blade track of FIG. 2 taken along line 3-3 showing that the blade track segments each include a runner and a pair of fiber-retention flanges extending radially outward from the runner and showing that the fiber wrap is positioned between the flanges of the blade track.

Each of the blade track segments 22 includes a runner 42 along which blades 32 of the turbine wheel assembly 30 move and a pair of flanges 44, 46 that extend from the runner 42 as shown in FIG. 3. An abradable layer 47 may be applied to a radially-inward face 27 of the runner 42. The flanges 44, 46 illustratively extend radially outward from an outer surface 25 of the runner 42 as shown in FIG. 3. The forward flange 44 defines an axially-forward face 41 of the blade track segment 22 and the aft flange 46 defines an axially-aft face 43 of the blade track segment 22. The flanges 44, 46 are spaced apart from one another and define a radially-outward opening, lock-receiving channel 49 with the runner 42. The lock-receiving channel 49 receives at least a portion of the composite-lock structure 24. In some embodiments, the blade track segments 22 may have an environmental barrier coating (EBC) or abradable coating applied to the radially-inward face 27 prior to or after assembly of the blade track 20.

The flanges 44, 46 are illustratively shown extending circumferentially along forward and aft edges of the blade track segments 22 in FIGS. 2 and 3. However, the flanges 44, 46 may be axially spaced from the forward and aft edges of the blade track segments 22 with portions of the outer surface 25 positioned between the flanges 44, 46 and the forward and aft edges. In some embodiments, seal members may be positioned on the portions of the outer surface 25 between the flanges 44, 46 and the forward and aft edges.

Figure 5:
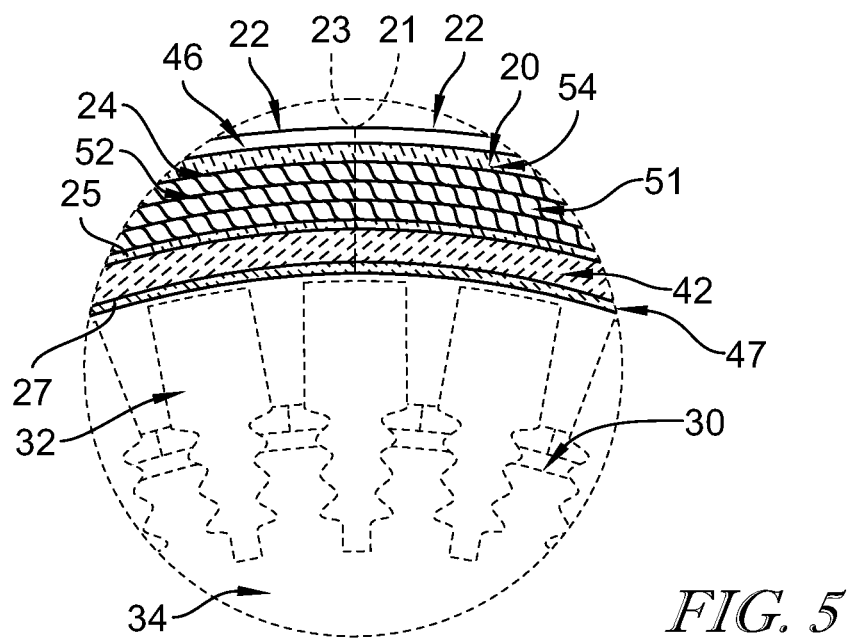
FIG. 5 is a detail view of the blade track of FIG. 4 showing that adjacent blade track segments engage with one another to keystone against one another and suggesting that the composite-lock structure provides a radially inward force that holds the blade track segments together.
Figure 6:
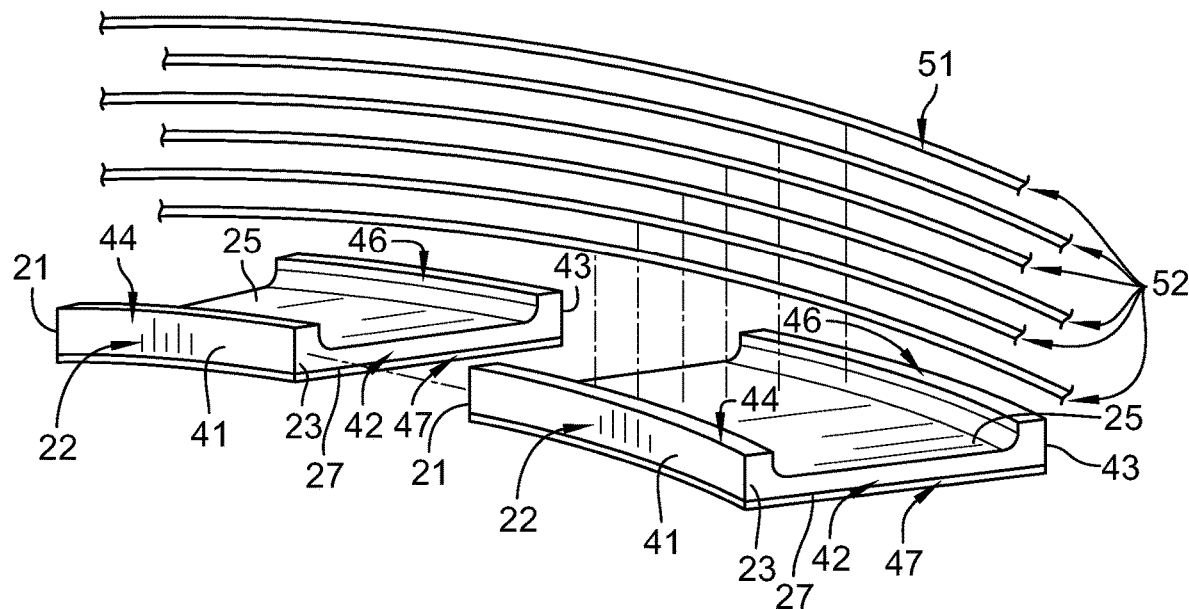
FIG. 6 is an exploded assembly view of a portion of the blade track suggesting that the blade track segments are arranged end-to-end and that the fiber wrap engages with a radially outer surface of the runner.

In the illustrative embodiment, the composite-lock structure 24 includes one or more reinforcement fibers 52 positioned within a lock body 54 as shown in FIGS. 3-5. The reinforcement fibers 52 comprise ceramic-containing materials and the lock body 54 comprises ceramic-matrix materials. In the illustrative embodiments, the reinforcement fibers 52 and the lock body 54 form a silicon-carbide, silicon-carbide ceramic-matrix composite, but may form an oxide, oxide ceramic-matrix composite or the like. In some embodiments, the reinforcement fibers 52 comprise a single, continuous fiber 52 that is wrapped along the outer surfaces 25 of the blade track segments 22, as suggested in FIG. 6, and around the ring of blade track segments 22 at least once, as suggested in FIG. 4. In other embodiments, the reinforcement fibers 52 are arranged in a fiber mat that may have a width substantially matching a width of the lock-receiving channel 49. In some embodiments, the fiber mat has a length allowing the fiber mat to be wrapped along the outer surfaces 25 of the blade track segments 22 and around the ring of blade track segments 22 at least once. Other arrangements for the reinforcement fibers 52 are possible.

The present disclosure contemplates taking advantage of the high temperature capability of ceramic-matrix composites (CMC) to improve specific fuel consumption (SFC) with a full hoop CMC blade track. By eliminating the gaps between the blade track segments 22, the cooling and leakage air flow rates needed to cool the blade track 20 are significantly reduced, thereby improving SFC. The elimination of gaps between blade track segments 22 also improves blade efficiency by reducing leakage from the gas path and minimizing negative effects on aerodynamics of the blades, leading to additional improvements in SFC.

Large full hoop blade tracks can be difficult to manufacture. First of all, it may require large processing equipment and in some cases this can require a different process as well. This may end up being costly because of the investment in larger equipment as well as development of a different process required by the new, larger processing equipment. Secondly, creating large diameter, thin walled parts may be difficult to do without distortion and out of roundness.

The present disclosure contemplates overcoming these difficulties by building a full hoop CMC blade track out of multiple segments, keystoned together, and held in place via a supporting hoop on their outer surface. Contact between the segments as they are forced together into a solid ring would provide a seal between the gas path and the cavity outboard of the ring of CMC segments. Integrally joining the ring of segments via co-processing, brazing, welding, etc. may further ensure sealing between segments.

The full hoop may be cross-keyed in place to mount it concentric to the centerline of the engine. Non-planar features between segments that would self locate the segments radially and/or axially to one another may be incorporated into the shown design without departing from the intended scope of the disclosure. Such features may be an assembly aid as well as a means to ensure parts do not slip relative to each other during operation.

In the illustrated embodiment, the segments would have short lips (or flanges) running circumferentially along the leading edge and trailing edge. The segments would be planar at their interfaces since the assembled full hoop will be integrally joined during subsequent processing. Another function of these lips (or flanges) would be to provide stiffness to keep the ring circular during processing, assembly, and operation. These lips (or flanges) could also be used to provide sealing surfaces at the leading edge and trailing edge.

A single fiber or a mat of fiber the same width as the distance between the lips may then wound about the assembly, like a spool. This wound assembly may be subsequently processed through slurry infiltration (SI) and melt infiltration (MI). The resulting component will be an integral assembly with fully processed segments integrally bonded together and to the wrapping fibers. The fiber portion of the assembly may be partially processed, so it will not obtain optimum CMC properties. However, that may be acceptable, since it merely needs to stay in place and carry any hoop load created from outward load on the segments. Note that pressure loads during operation are expected to be inward, loading the hoop in compression. So the fiber wrap is more to aid assembly, maintain segment to segment alignment, and to carry any transient reverse, tensile, loading.

In one embodiment of an assembly process, the blade track segments 22 are each formed and CVI processed prior to being circumferentially arranged in a continuous ring. The ring of blade track segments 22 may then be wrapped with the fiber wrap 51. The fiber wrap 51 is then processed by slurry infiltration and melt infiltration. The slurry and melt infiltration processes may also process portions of the blade track segments 22. In some embodiments, the fiber or fibers in the fiber wrap 51 are coated with Boron Nitride. This fiber coating creates a boundary that provides some forgiveness for differential coefficients of thermal expansion, for different elastic moduluses, and for environmental protection, for example. In some embodiments, the blade track segments 22 are arranged into the ring prior to CVI processing and wrapped with the fiber wrap 51. The wrapped ring of blade track segments 22 would then receive CVI processing.

The blade track 20 is illustratively shown in the turbine 18 of the gas turbine engine in FIG. 1. However, the blade track 20 may be used in other portion of the engine 10, such as the compressor 14 for example. The blade track 20 may have non-planar axial or radial locating features between the blade track segments 22. Alternatively, the blade track segments 22 may be assembled together in a partially processed state, such as after chemical vapor infiltration (CVI), and receive final processing together, such as through a slurry and/or melt infiltration. As such, the blade track segments 22 would be integrally joined, not allowing relative movement during operation of the engine 10.

Figure 7:
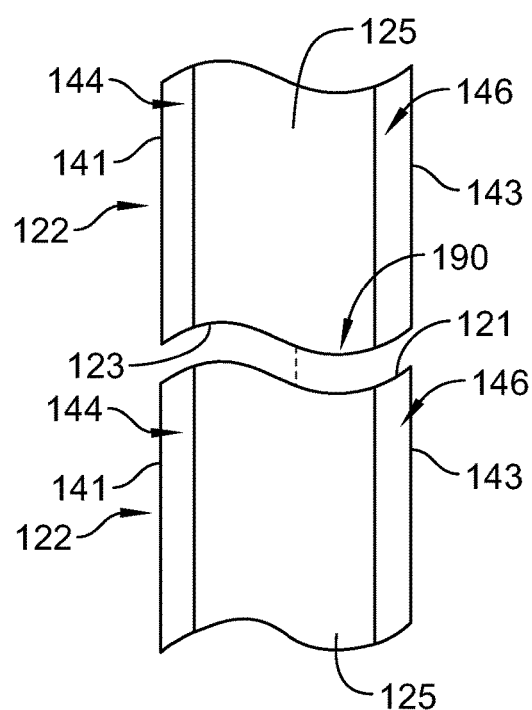
FIG. 7 is a top plan view of a pair of blade track segments including one embodiment of a non-planar locating feature formed along circumferential end faces of the blade track segments.

In one illustrative embodiment, blade track segments 122 include non-planar locating features 190 along circumferential end faces 121, 123 as shown in FIG. 7. Each blade track segment 122 includes a pair of flanges 144, 146 extending from an outer surface 125 along axially-forward and axially-aft faces 141, 143 of the blade track segments 122. The circumferential end faces 121, 123 extend between the axial faces 141, 143 and are formed to include the non-planar locating feature 190.

The non-planar locating feature 190 has a curved profile as shown in FIG. 7. The curved profile of the non-planar locating feature 190 on end face 121 is substantially a mirror image of the curved profile of the non-planar locating feature 190 on end face 123. As such, end face 121 of one blade track segment 122 can engage with end face 123 of an adjacent blade track segment 122 along a substantially entire length of the end faces 121, 123 between the axial faces 141, 143.

Figure 8:
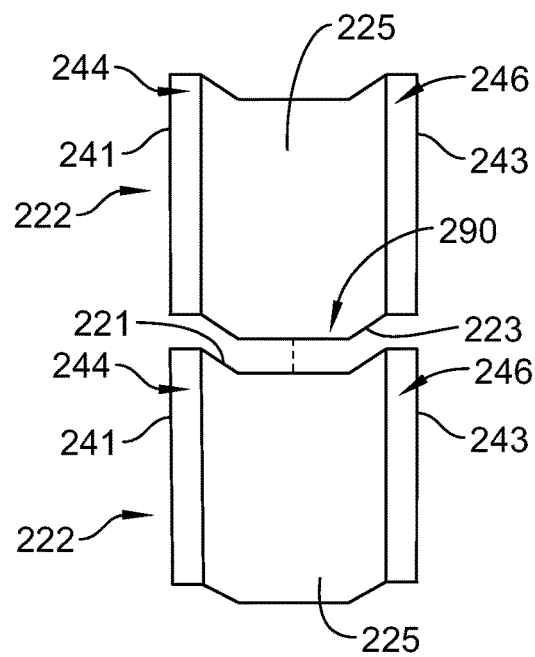
FIG. 8 is a top plan view of a pair of blade track segments including another embodiment of a non-planar locating feature formed along circumferential end faces of the blade track segments.

In another illustrative embodiment, blade track segments 222 include non-planar locating features 290 along circumferential end faces 221, 223 as shown in FIG. 8. Each blade track segment 222 includes a pair of flanges 244, 246 extending from an outer surface 225 along axially-forward and axially-aft faces 241, 243 of the blade track segments 222. The circumferential end faces 221, 223 extend between the axial faces 241, 243 and are formed to include the non-planar locating feature 290.

The non-planar locating feature 290 has an angular profile as shown in FIG. 8. The angular profile of the non-planar locating feature 290 on end face 221 is substantially a mirror image of the angular profile of the non-planar locating feature 290 on end face 223. As such, end face 221 of one blade track segment 222 can engage with end face 223 of an adjacent blade track segment 222 along a substantially entire length of the end faces 221, 223 between the axial faces 241, 243.

The non-planar locating features 190, 290 axially align adjacent blade track segments 122, 222. Non-planar locating features having curved or angular profiles may also be added to radially align adjacent blade track segments. Other shapes and configurations for the non-planar locating features are possible.

Figure 9:
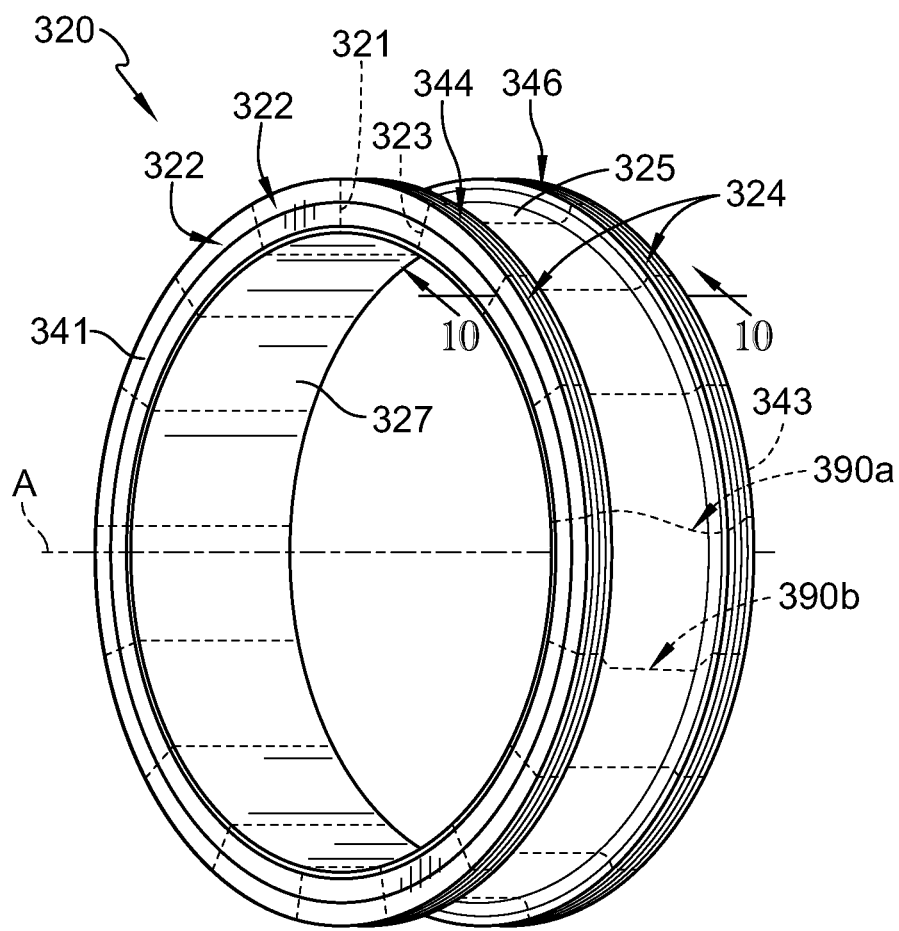
FIG. 9 is a perspective view of a blade track adapted for use in a turbine of the gas turbine engine to block hot gasses from passing over blades of a turbine wheel showing that the blade track includes a plurality of blade track segments arranged circumferentially adjacent to one another and a fiber wrap extending around the segments to provide a composite-lock structure that holds the blade track segments in a ring.
Figure 10:
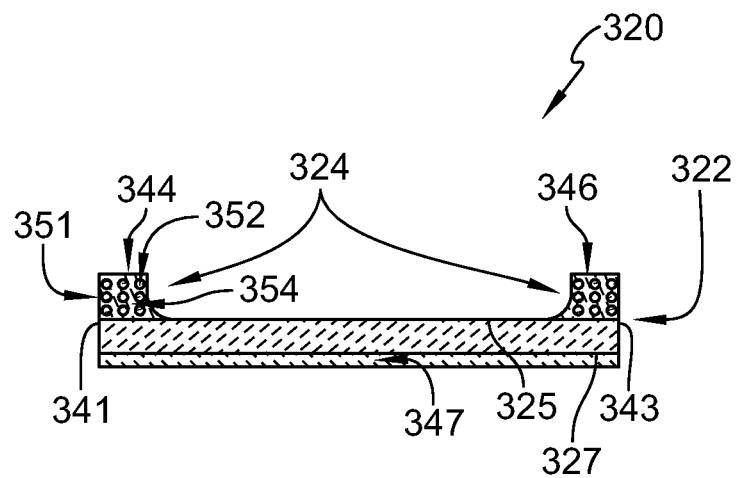
FIG. 10 is a sectional view of the blade track of FIG. 9 taken along line 10-10 showing that the composite-lock structure includes a pair of flanges extending radially outward from a central runner of the blade track segments along forward and aft faces of the blade track segments.

Another blade track 320 in accordance with the present disclosure is shown in FIGS. 9 and 10. The blade track 320 includes a plurality of blade track segments 322 that cooperate to form a ring and a composite-lock structure 324 integrated with the blade track segments 322. The blade track segments 322 are each shaped to extend part-way around a central axis A and comprise ceramic-matrix composite materials. The composite-lock structure 324 illustratively includes a pair of matrix-infiltrated fiber wraps 351 that extends around the blade track segments 322 and that is integrated with the blade track segments 322 to form full hoop blade track 320.

Each of the blade track segments 322 includes opposing circumferential end faces 321, 323 and a radially outer surface 325 extending between the end faces 321, 323 as shown in FIG. 9. The blade track segments 322 are positioned circumferentially around the central axis A to form a substantially continuous ring and the composite-lock structure 324 is positioned to engage the outer surfaces 325 of the blade track segments 322 to maintain the shape of the blade track 320. In some embodiments, the blade track segments 322 include non-planar locating features 390a along the end faces 321, 323. In other embodiments, the blade track segments 322 include non-planar locating features 390b along the end faces 321, 323. Each blade track segment 322 is illustratively made from silicon-carbide, silicon-carbide ceramic-matrix composite, but may be made from oxide, oxide ceramic-matrix composite or the like.

In the illustrative embodiment, the end faces 321, 323 extend radially inward from the outer surface 325 and are positioned to lie in a plane defined in part by the central axis A as suggested in FIG. 9. The composite-lock structure 24 is configured to provide a radially-inward force toward the central axis A against the blade track segments 322. The end faces 321, 323 of adjacent blade track segments 322 engage with one another to provide an opposing radially-outward force away from the central axis A and against the composite-lock structure 324. As such, each blade track segment 322 acts as a keystone to for circumferentially-adjacent blade track segments 322 maintain the form of the ring and blade track 320. The composite-lock structure 324 maintains alignment of the blade track segments 322 in the ring.

Radially-inward loads placed on the blade track 320 are distributed through the blade track segments 322 as compressive hoop load as suggested in FIG. 9. Radially-outward loads placed on the blade track 320 are distributed through the composite-lock structure 324 as tensile hoop load. In some embodiments, engagement between the end faces 321, 323 forms a seal between adjacent blade track segments 322. In some embodiments, the blade track segments 322 are integrally joined through co-processing, welding, or brazing, for example, to form a seal between adjacent blade track segments 322.

The matrix-infiltrated fiber wraps 351 form a pair of flanges 344, 346 that extend from the blade track segments 322 as shown in FIG. 9. The flanges 344, 346 extend radially outward from an outer surface 325 of the blade track segments 322 as shown in FIGS. 9 and 10. The forward flange 344 defines an axially-forward face 341 of the blade track segments 322 and the aft flange 346 defines an axially-aft face 343 of the blade track segments 322. The flanges 344, 346 are spaced apart from one another.

An abradable layer 347 may be applied to a radially-inward face 327 of the blade track segments 322 as shown in FIG. 8. In some embodiments, the blade track segments 322 may have an environmental barrier coating (EBC) or abradable coating applied to the radially-inward face 327 prior to or after assembly of the blade track 320.

The flanges 344, 346 are illustratively shown extending circumferentially along forward and aft edges of the blade track segments 322 in FIGS. 9 and 10. However, the flanges 344, 346 may be axially spaced from the forward and aft edges of the blade track segments 322 with portions of the outer surface 325 positioned between the flanges 344, 346 and the forward and aft edges. In some embodiments, seal members may be positioned on the portions of the outer surface 325 between the flanges 344, 346 and the forward and aft edges.

In the illustrative embodiment, the composite-lock structure 324 includes one or more reinforcement fibers 352 positioned within a lock body 354 as shown in FIGS. 9 and 10. The reinforcement fibers 352 comprise ceramic-containing materials and the lock body 354 comprises ceramic-matrix materials. In the illustrative embodiments, the reinforcement fibers 352 and the lock body 354 form a silicon-carbide, silicon-carbide ceramic-matrix composite, but may form an oxide, oxide ceramic-matrix composite or the like. In some embodiments, the reinforcement fibers 352 for each flange 344, 346 comprise a single, continuous fiber 352 that is wrapped along the outer surfaces 325 of the blade track segments 322 and around the ring of blade track segments 322 at least once. In other embodiments, the reinforcement fibers 352 are arranged in a fiber mat. In some embodiments, the fiber mat has a length allowing the fiber mat to be wrapped along the outer surfaces 325 of the blade track segments 322 and around the ring of blade track segments 322 at least once. Other arrangements for the reinforcement fibers 352 are possible.

The blade track 320 may have non-planar axial or radial locating features between the blade track segments 322. Alternatively, the blade track segments 322 may be assembled together in a partially processed state, such as after chemical vapor infiltration (CVI), and receive final processing together, such as through a slurry and/or melt infiltration. As such, the blade track segments 322 would be integrally joined, not allowing relative movement during operation of the engine.

Figure 11:
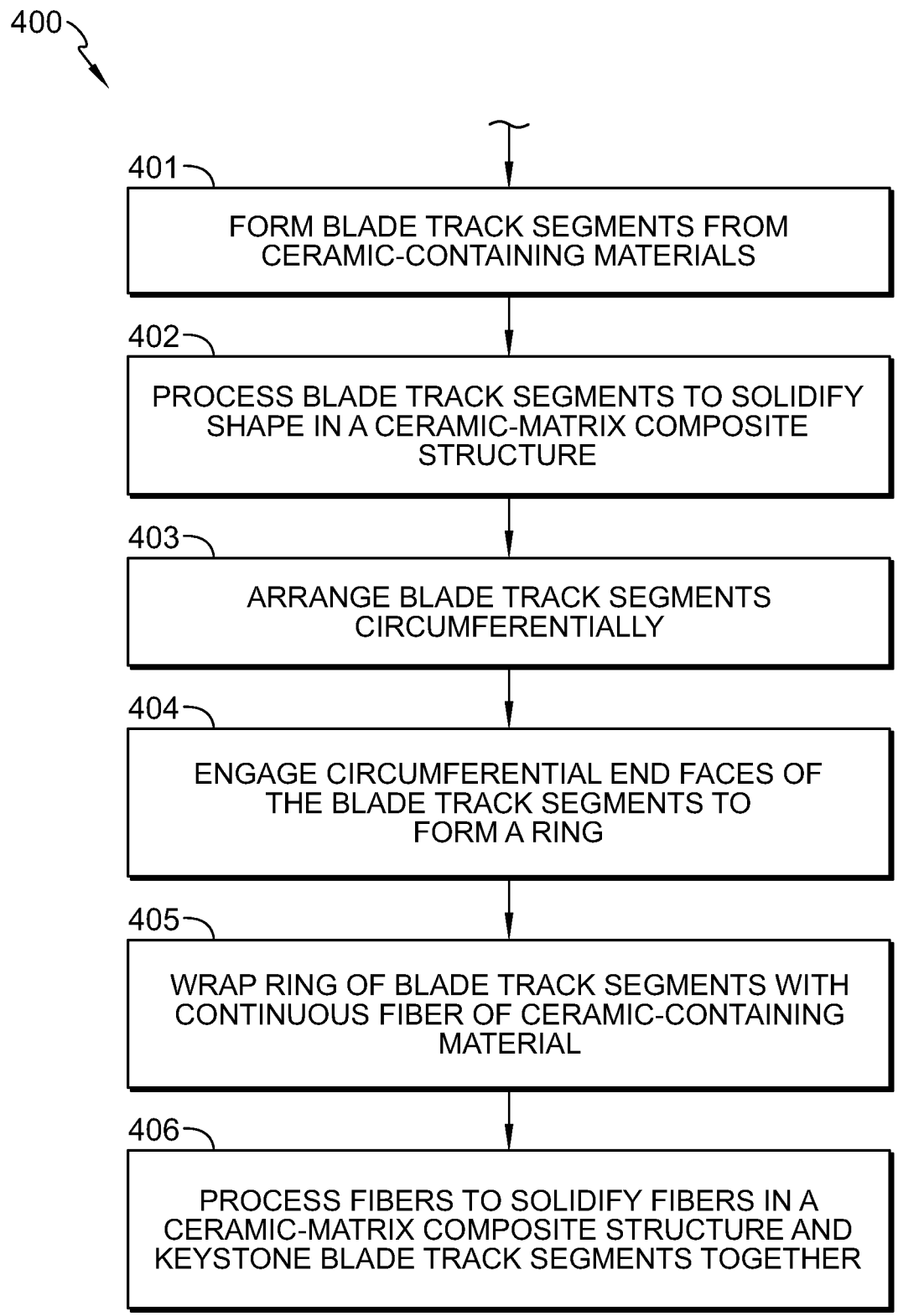
FIG. 11 is a diagrammatic view of an illustrative process for manufacturing a blade track.

In one illustrative embodiment, a process 400 is used to manufacture the blade track 20 or blade track 320 as shown in FIG. 11. The process begins at 401 where blade track segments are formed from ceramic-containing materials. In some embodiments, forming each blade track segment includes positioning one or more fiber-woven sheets of ceramic-containing material into a mold cavity to define the shape of the blade track segment. The blade track segments are processed to solidify their shape in a ceramic-matrix composite structure as indicated at 402. In some embodiments, processing the blade track segments includes injecting a ceramic-matrix material into the mold cavity and hardening the ceramic-matrix material.

The processed blade track segments are arranged circumferentially around a central axis as indicated at 403 in FIG. 11. In some embodiments, arranging the blade track segments includes positioning a circumferential end face of one blade track segment in confronting relation to a circumferential end face of another blade track segment. In some embodiments, arranging the blade track segments further includes axially aligning the flanges of the blade track segments and radially aligning the inner surfaces of the blade track segments. Circumferential end faces of adjacent blade track segments are engaged with one another to form a substantially continuous ring of blade track segments as indicated at 404.

The ring of blade track segments is wrapped with a continuous fiber of ceramic-containing material as indicated at 405 in FIG. 11. In some embodiments, wrapping the fiber includes positioning the fiber along radially-outer surfaces of the blade track segments. In some embodiments, the fiber is wrapped around the ring of blade track segments at least once. In some embodiments, the fiber is wrapped around the ring of blade track segments several times. In other embodiments, a fiber mat comprising ceramic-containing materials is used in place of the single continuous fiber.

The ring, including the fibers and ceramic-matrix material, are processed to solidify the fibers in a ceramic-matrix composite structure and keystone the blade track segments together as indicated at 406 in FIG. 11. During processing, the wrapped fiber is infiltrated with a ceramic-matrix material. In some embodiments, a slurry infiltration process is used. In other embodiments, a melt infiltration process is used. In some embodiments, the fiber is suspended in the ceramic-matrix material and does not contact the radially outer surfaces of the blade track segments after processing.

In some embodiments, the fiber engages with the radially outer surfaces of the blade track segments after processing. In some embodiments, a portion of the fiber is suspended in the ceramic-matrix material while another portion of the fiber engages with the radially outer surfaces of the blade track segments after processing.

During manufacture via the method 400, the segments may undergo CVI processing. The segments may then be assembled together into a full hoop. By butting the segments up against each other, they form a complete hoop in which none of the segments can move radially inward due to the neighboring segments. Inward load is carried as compressive hoop load.

Figure 12:
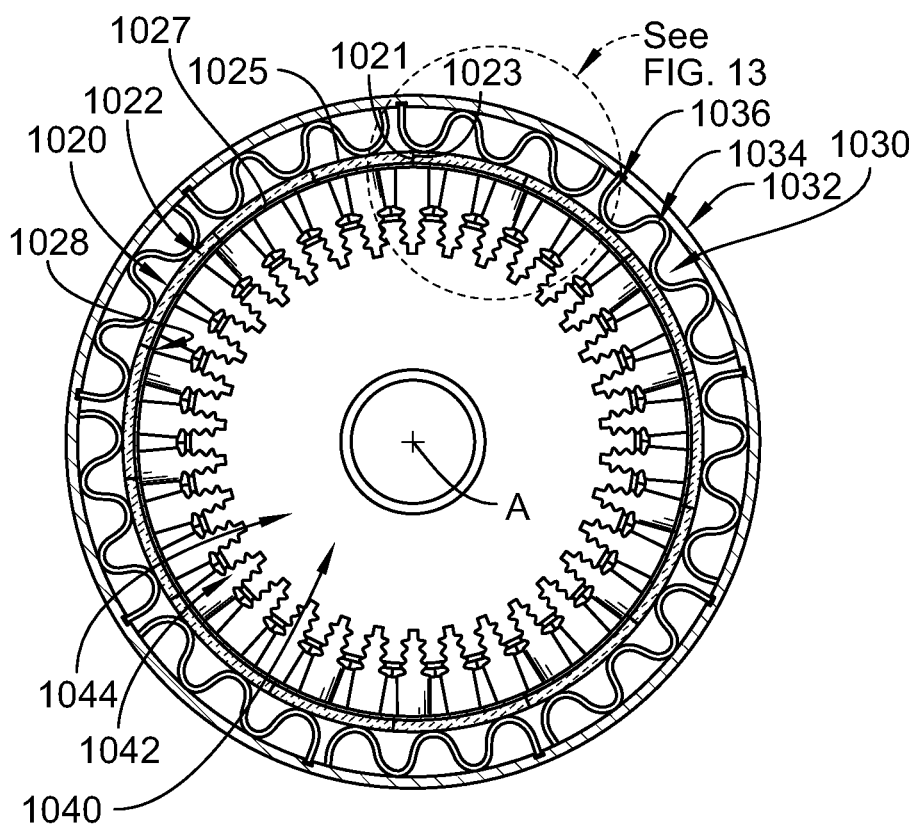
FIG. 12 is a sectional view of the gas turbine engine of FIG. 1 showing a blade track including a plurality of blade track segments positioned to surround a turbine wheel assembly of the turbine and one embodiment of a track biaser in accordance with the present disclosure positioned to bias the blade track segments radially inward toward a central axis of the gas turbine engine.

In another illustrative embodiment, the turbine 18 illustratively includes at least one turbine wheel assembly 1040, a blade track 1020 positioned to surround the turbine wheel assembly 1040, and a track biaser 1030 as shown in FIG. 12. The turbine wheel assembly 1040 includes a plurality of blades 1042 coupled to a rotor disk 1044 for rotation therewith. The hot, high pressure combustion products from the combustor 16 are directed toward the blades 1042 of the turbine wheel assemblies 1040. The blades 1042 are in turn pushed by the combustion products to cause the turbine wheel assembly 1040 to rotate; thereby, driving the rotating components of the compressor 14 and/or the fan 12.

The blade track 1020 extends around the turbine wheel assembly 1040 to block combustion products from passing over the blades 1042 without pushing the blades 1042 to rotate as suggested in FIG. 12. The blade track 1020 includes a plurality of blade track segments 1022 that cooperate to form a ring. The blade track segments 1022 are each shaped to extend part-way around a central axis A and comprise ceramic-matrix composite materials. Each blade track segment 1022 is illustratively made from silicon-carbide, silicon-carbide ceramic-matrix composite, but may be made from oxide, oxide ceramic-matrix composite or the like.

Figure 13:
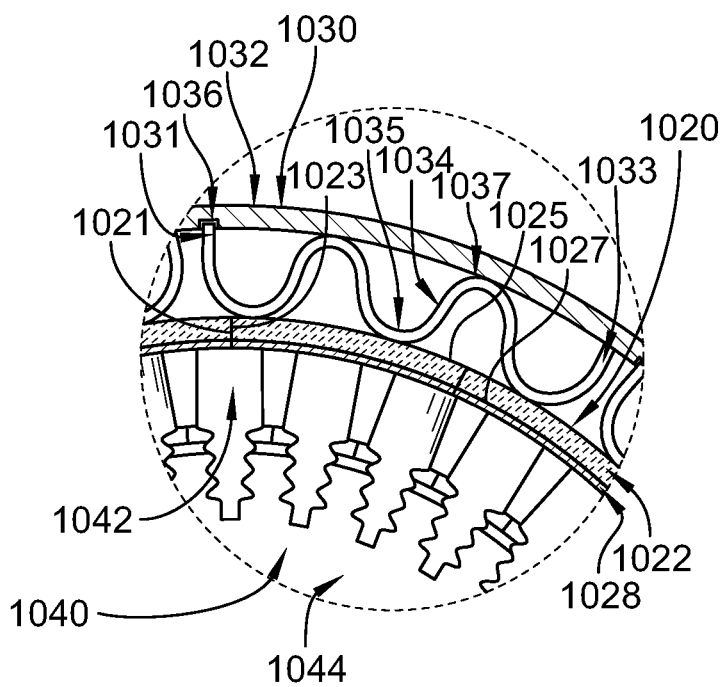
FIG. 13 is a detail view of the track biaser of FIG. 12 showing that circumferential end faces of adjacent blade track segments engage with one another to keystone against one another and suggesting that the track biaser includes a plurality of wave springs engaged between an inner case of the turbine and the blade track segments to provide a radially inward force that holds the blade track segments together.

Each of the blade track segments 1022 includes opposing circumferential end faces 1021, 1023 and a radially outer surface 1025 extending between the end faces 1021, 1023 as shown in FIGS. 12 and 13. An abradable layer 1028 may be applied to a radially-inward face 1027 of the blade track segments 1022. The blade track segments 1022 are positioned circumferentially around the central axis A to form a substantially continuous ring and the track biaser 1030 is positioned to engage the outer surfaces 1025 of the blade track segments 1022 to maintain the shape of the blade track 1020. In some embodiments, the end faces 1021, 1023 may include axial and/or radial alignment features to align the blade track segments 1022 during assembly.

In the illustrative embodiment, the track biaser 1030 includes a plurality of wave springs 1034 (sometimes called wave washers) positioned between the blade track 1020 and an inner case 1032 of the turbine 18 as shown in FIG. 12. Each wave spring 1034 comprises a flexible metallic material, and includes a first end 1031 and a second end 1033 biased toward one another. The first end 1031 is engaged with a recess 1036 formed in the inner case 1032 to maintain positioning of the wave spring 1034. Each wave spring is formed to include a series of peaks 1037 for engaging the inner case 1032 and a series of valleys 1035 for engaging the blade track segments 1022.

In some embodiments, the wave springs 1034 comprise ceramic-matrix composite materials and are thinned along their length with additional peaks 1037 and valleys 1035 to provide flexibility. In other embodiments, a single, continuous wave spring 1034 extends around the blade track 1020 and is not circumferentially constrained by the recess 1036. The single, continuous wave spring 1034 includes a gap to allow radial expansion and contraction. In some embodiments, the wave springs 1034 are formed to include air holes positioned between the peaks 1037 and valleys 1035 to allow cooling air to flow around the blade track 1020. In some embodiments, the inner case 1032 includes impingement bosses which extend radially inward and are formed to include impingement holes for passing cooling air onto the blade track 1020. In such an embodiment, the impingement bosses may pass through holes in the wave springs 1034 or between the wave springs 1034 to circumferentially locate the wave springs 1034.

The end faces 1021, 1023 of the blade track segments 1022 extend radially inward from the outer surface 1025 and are positioned to lie in a plane defined in part by the central axis A as suggested in FIG. 12. The track biaser 1030 is configured to provide a radially-inward force toward the central axis A against the blade track segments 1022. The end faces 1021, 1023 of adjacent blade track segments 1022 engage with one another to provide an opposing radially-outward force away from the central axis A and against the track biaser 1030. As such, each blade track segment 1022 acts as a keystone for circumferentially-adjacent blade track segments 1022 to maintain the form of the blade track 1020. The track biaser 1030 maintains alignment of the blade track segments 1022 in the ring.

Radially-inward loads placed on the blade track 1020 are distributed through the blade track segments 1022 as compressive hoop load as suggested in FIG. 12. Radially-outward loads placed on the blade track 1020 are distributed through the track biaser 1030. The ends 1031, 1033 of the wave springs 1034 move toward one another as the blade track segments 1022 are forced inward. The ends 1031, 1033 of the wave springs 1034 move away from one another as the blade track segments 1022 are forced outward. In some embodiments, engagement between the end faces 1021, 1023 forms a seal between adjacent blade track segments 1022. In some embodiments, the blade track segments 1022 are integrally joined through co-processing, welding, or brazing, for example, to form a seal between adjacent blade track segments 1022.

Figure 14:
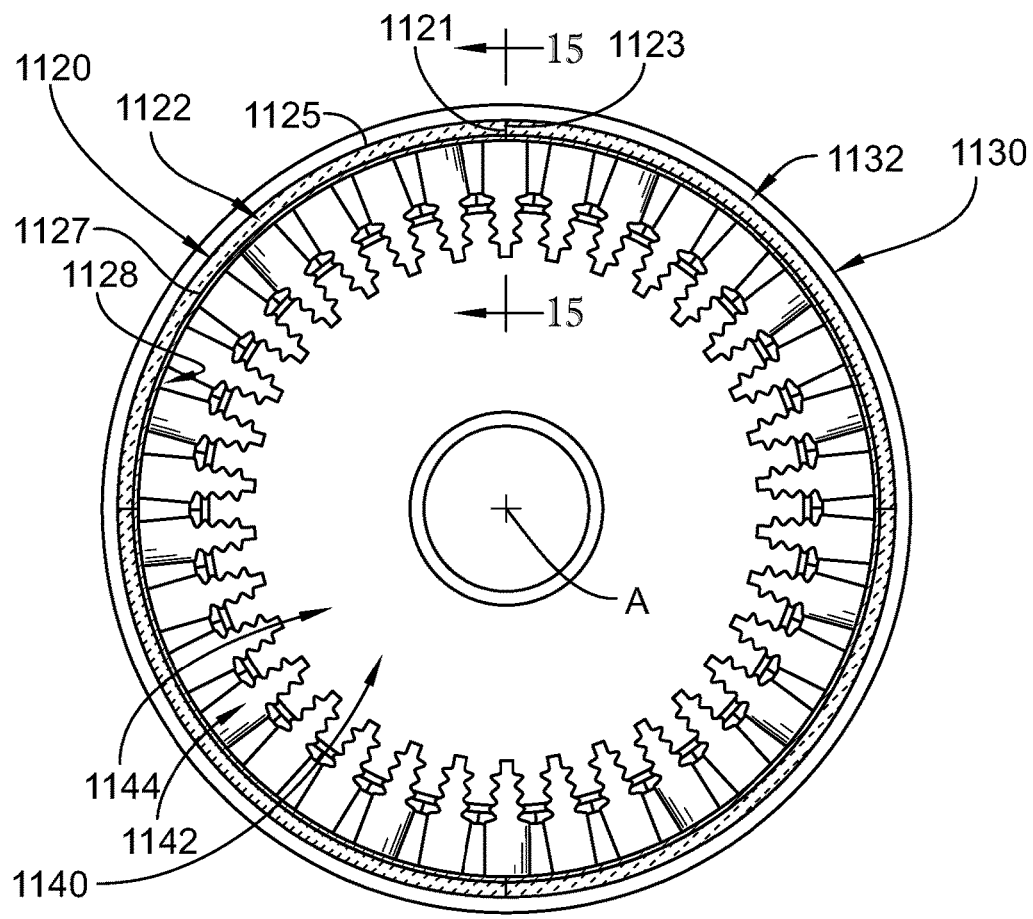
FIG. 14 is a view similar to FIG. 12 showing a blade track including a plurality of blade track segments positioned to surround the turbine wheel assembly of the turbine and another embodiment of a track biaser in accordance with the present disclosure positioned to bias the blade track segments radially inward toward a central axis of the gas turbine engine.

In another embodiment, the turbine 18 of the gas turbine engine 10 includes at least one turbine wheel assembly 1140, a blade track 1120 positioned to surround the turbine wheel assembly 1140, and a track biaser 1130 as shown in FIG. 14. The turbine wheel assembly 1140 includes a plurality of blades 1142 coupled to a rotor disk 1144 for rotation therewith. The hot, high pressure combustion products from the combustor 16 are directed toward the blades 1142 of the turbine wheel assemblies 1140. The blades 1142 are in turn pushed by the combustion products to cause the turbine wheel assembly 1140 to rotate; thereby, driving the rotating components of the compressor 14 and/or the fan 12.

The blade track 1120 extends around the turbine wheel assembly 1140 to block combustion products from passing over the blades 1142 without pushing the blades 1142 to rotate as suggested in FIG. 14. The blade track 1020 includes a plurality of blade track segments 1122 that cooperate to form a ring. The blade track segments 1122 are each shaped to extend part-way around the central axis A and comprise ceramic-matrix composite materials. Each blade track segment 1122 is illustratively made from silicon-carbide, silicon-carbide ceramic-matrix composite, but may be made from oxide, oxide ceramic-matrix composite or the like.

Figure 15:
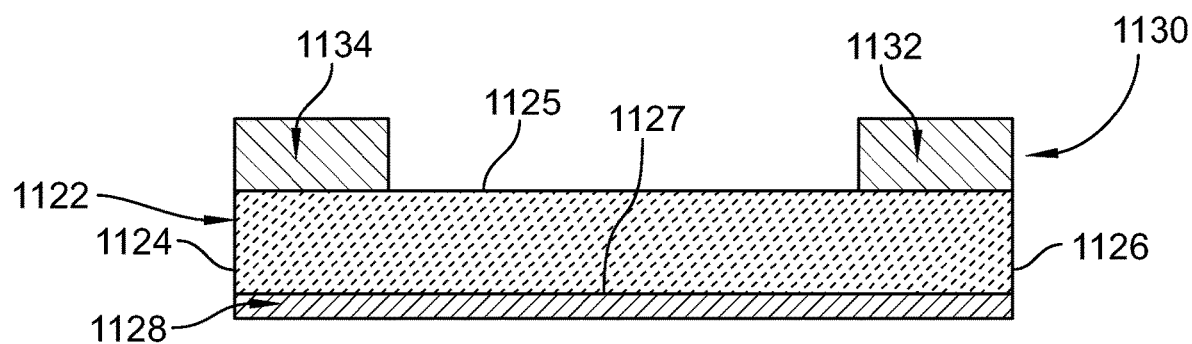
FIG. 15 is a sectional view of the track biaser of FIG. 14 taken along line 15-15 showing that the track biaser includes a pair of metallic rings engaged with a radially outer surface of the blade track segments to provide a radially inward force that holds the blade track segments together.

Each of the blade track segments 1122 includes opposing circumferential end faces 1121, 1123 and a radially outer surface 1125 extending between the end faces 1121, 1123 as shown in FIGS. 14 and 15. An abradable layer 1128 may be applied to a radially-inward face 1127 of the blade track segments 1122. The blade track segments 1122 are positioned circumferentially around the central axis A to form a substantially continuous ring and the track biaser 1130 is positioned to engage the outer surfaces 1125 of the blade track segments 1122 to maintain the shape of the blade track 1120.

In the illustrative embodiment, the track biaser 1130 includes a pair of metallic rings 1132, 1134 positioned to surround the blade track 1120 as shown in FIGS. 14 and 15. Each ring 1132, 1134 is sized to engage with the outer surfaces 1125 of the blade track segments 1122. In the illustrative embodiment, the ring 1134 is aligned with axially-forward faces 1124 of the blade track segments 1122 and the ring 1132 is aligned with axially-aft faces 1126.

In some embodiments, the rings 1132, 1134 are press-fit onto the assembled blade track 1120. In other embodiments, the rings 1132, 1134 are heated to expand the rings 1132, 1134, positioned around the blade track 1120, and subsequently cooled to engage the blade track segments 1122. In yet other embodiments, a step may be machined into the outer surfaces 1125 of the blade track segments 1122 along the axially-forward and axially-aft faces 1124, 1126 sized to receive the rings 1132, 1134. In such an embodiment, the rings 1132, 1134 would be radially inset from the outer surface 1125. In yet other embodiments, the rings 1132, 1134 may be formed as metallic garter springs to maintain pressure against the outer surfaces 1125 of the blade track segments 1122 as the temperature varies.

In some embodiments, the rings 1132, 1134 comprise silicon-carbide, silicon-carbide ceramic-matrix composite, but may be made from oxide, oxide ceramic-matrix composite or the like. In such an embodiment, the rings 1132, 1134 can be assembled on to the blade track 1120 using similar techniques described above. Alternatively, if the blade track segments 1122 include alignment features, the rings 1132, 1134 may be loosely fit onto the blade track 1120 and will provide a tighter interference fit at the operating temperature of the engine 10 due to a differential in temperature between the rings 1132, 1134 and blade track 1120.

The end faces 1121, 1123 of the blade track segments 1122 extend radially inward from the outer surface 1125 and are positioned to lie in a plane defined in part by the central axis A as suggested in FIG. 14. The track biaser 1130 is configured to provide a radially-inward force toward the central axis A against the blade track segments 1122. The end faces 1121, 1123 of adjacent blade track segments 1122 engage with one another to provide an opposing radially-outward force away from the central axis A and against the track biaser 1130. As such, each blade track segment 1122 acts as a keystone for circumferentially-adjacent blade track segments 1122 to maintain the form of the blade track 1120. The track biaser 1130 maintains alignment of the blade track segments 1122 in the ring.

Radially-inward loads placed on the blade track 1120 are distributed through the blade track segments 1122 as compressive hoop load as suggested in FIG. 14. Radially-outward loads placed on the blade track 1120 are distributed through the rings 1132, 1134 as tensile hoop load. In some embodiments, engagement between the end faces 1121, 1123 forms a seal between adjacent blade track segments 1122. In some embodiments, the blade track segments 1122 are integrally joined through co-processing, welding, or brazing, for example, to form a seal between adjacent blade track segments 1122.

Figure 16:
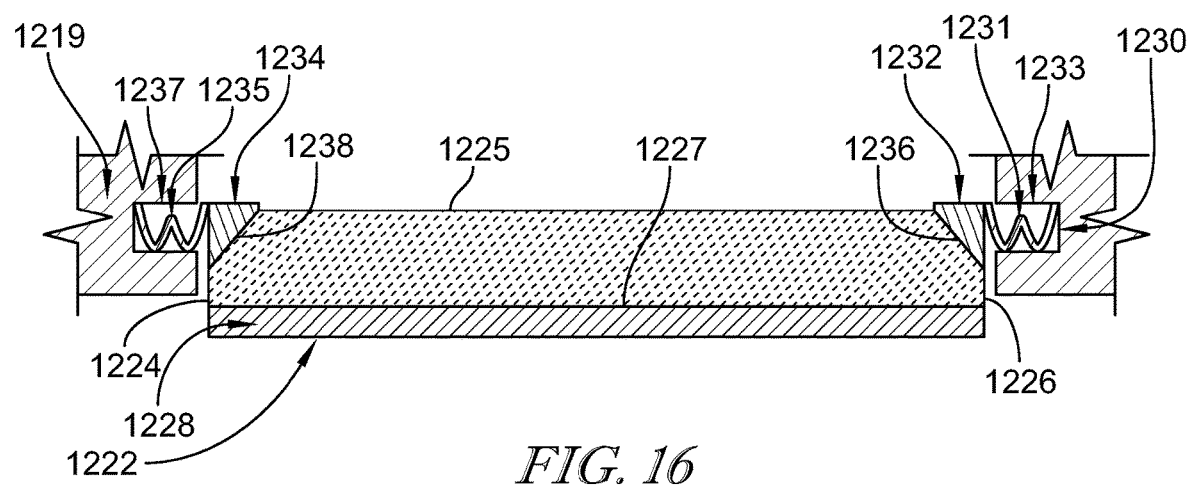
FIG. 16 is a view similar to FIG. 15 showing that another embodiment of a track biaser in accordance with the present disclosure includes a pair of metallic rings positioned to engage with angled, axial faces of the blade track segments to provide a radially inward force that holds the blade track segments together and suggesting that a pair of springs force the rings toward one another and against the blade track segments.

In another embodiment, a track biaser 1230 includes a pair of metallic rings 1232, 1234 positioned to engage with bevel surfaces 1236, 1238 of a blade track segment 1222 as shown in FIG. 16. In the illustrative embodiment, the ring 1234 is aligned along an axially-forward face 1224 of the blade track segment 1222 and the ring 1232 is aligned along an axially-aft face 1226. The rings 1232, 1234 are biased toward one another by springs 1231, 1235, respectively. The springs 1231, 1235 are positioned in recesses 1233, 1237 formed in an inner case 1219 of the gas turbine engine 10. In some embodiments, the springs 1231, 1235 act as sealing elements. In some embodiments, the blade track segment 1222 includes an abradable layer 1228 coupled to a radially-inward face 1227. In some embodiments, the rings 1232, 1234 comprise silicon-carbide, silicon-carbide ceramic-matrix composite, but may be made from oxide, oxide ceramic-matrix composite or the like.

The rings 1232, 1234 engage with the bevel surfaces 1236, 1238 to provide a radially-inward force against the blade track segments 1222 as suggested in FIG. 16. The bevel surfaces 1236, 1238 extend between the axial faces 1224, 1226 and a radially outer surface 1225 of the blade track segment 1222. Circumferential end faces of adjacent blade track segments 1222 engage with one another to provide an opposing radially-outward force against the track biaser 1230. As such, each blade track segment 1222 acts as a keystone for circumferentially-adjacent blade track segments 1222. The track biaser 1230 maintains alignment of the blade track segments 1222 in a ring. Each blade track segment 1222 is illustratively made from silicon-carbide, silicon-carbide ceramic-matrix composite, but may be made from oxide, oxide ceramic-matrix composite or the like.

Figure 17:
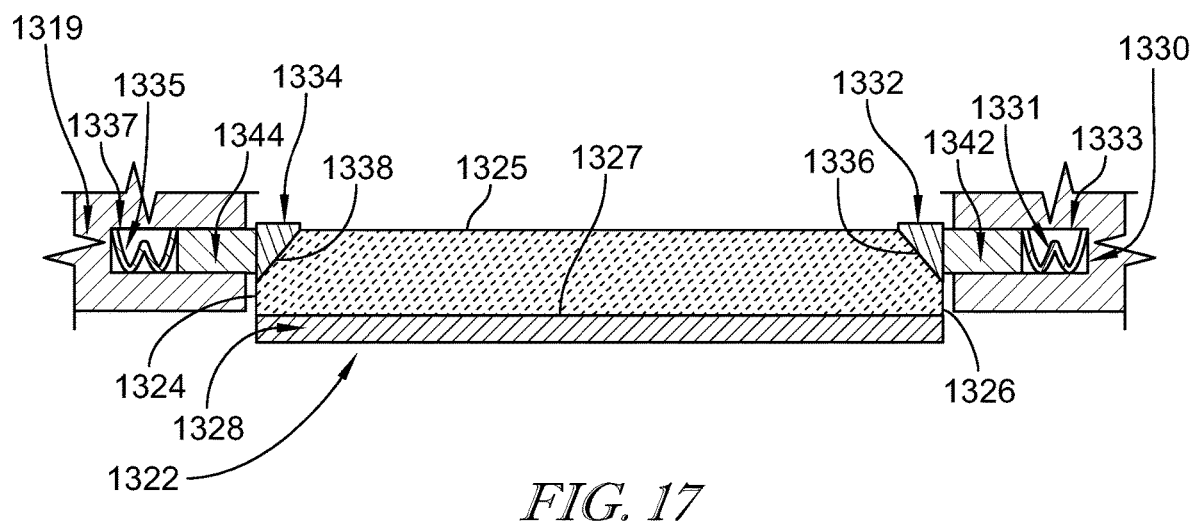
FIG. 17 is a view similar to FIG. 16 showing that another embodiment of a track biaser in accordance with the present disclosure includes a pair of metallic rings positioned to engage with angled, axial faces of the blade track segments to provide a radially inward force that holds the blade track segments together and suggesting that a pair of springs engage with spacers to force the rings toward one another and against the blade track segments.

In another embodiment, a track biaser 1330 includes a pair of metallic rings 1332, 1334 positioned to engage with bevel surfaces 1336, 1338 of a blade track segment 1322 as shown in FIG. 17. In the illustrative embodiment, the ring 1334 is aligned along an axially-forward face 1324 of the blade track segment 1322 and the ring 1332 is aligned along an axially-aft face 1326. The rings 1332, 1334 are biased toward one another by springs 1331, 1335, respectively. The springs 1331, 1335 are positioned in recesses 1333, 1337 formed in an inner case 1319 of the gas turbine engine 10. A pair of spacers 1342, 1344 are positioned between the springs 1331, 1335 and rings 1332, 1334. In some embodiments, the springs 1331, 1335 act as sealing elements. In some embodiments, the blade track segment 1322 includes an abradable layer 1328 coupled to a radially-inward face 1327. In some embodiments, the rings 1332, 1334 comprise silicon-carbide, silicon-carbide ceramic-matrix composite, but may be made from oxide, oxide ceramic-matrix composite or the like.

The rings 1332, 1334 engage with the bevel surfaces 1336, 1338 to provide a radially-inward force against the blade track segments 1322 as suggested in FIG. 17. The bevel surfaces 1336, 1338 extend between the axial faces 1324, 1326 and a radially outer surface 1325 of the blade track segment 1322. Circumferential end faces of adjacent blade track segments 1322 engage with one another to provide an opposing radially-outward force against the track biaser 1330. As such, each blade track segment 1322 acts as a keystone for circumferentially-adjacent blade track segments 1322. The track biaser 1330 maintains alignment of the blade track segments 1322 in a ring. Each blade track segment 1322 is illustratively made from silicon-carbide, silicon-carbide ceramic-matrix composite, but may be made from oxide, oxide ceramic-matrix composite or the like.

Figure 18:
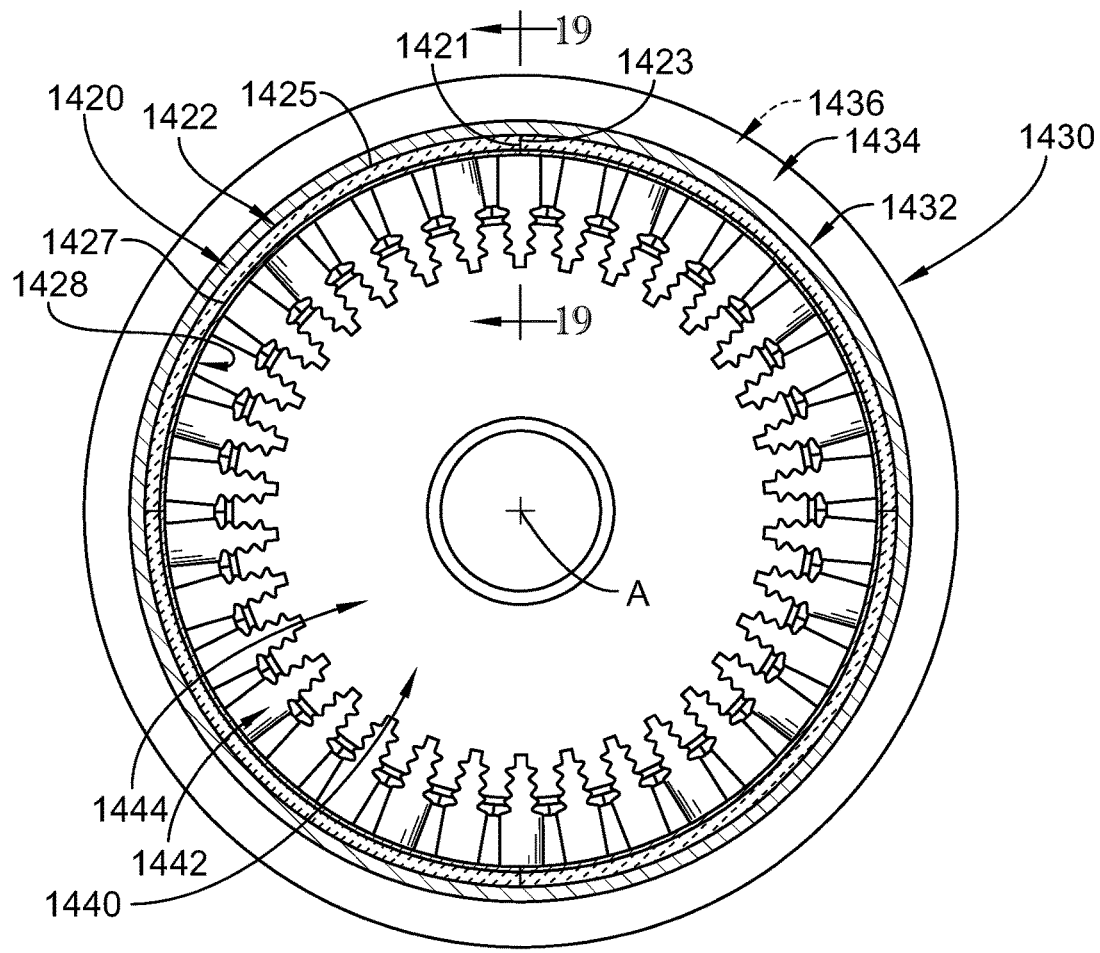
FIG. 18 is a view similar to FIG. 12 showing a blade track including a plurality of blade track segments positioned to surround the turbine wheel assembly of the turbine and another embodiment of a track biaser in accordance with the present disclosure positioned to bias the blade track segments radially inward toward a central axis of the gas turbine engine.

In another embodiment, the turbine 18 of the gas turbine engine 10 includes at least one turbine wheel assembly 1440, a blade track 1420 positioned to surround the turbine wheel assembly 1440, and a track biaser 1430 as shown in FIG. 18. The turbine wheel assembly 1440 includes a plurality of blades 1442 coupled to a rotor disk 1444 for rotation therewith. The hot, high pressure combustion products from the combustor 16 are directed toward the blades 1442 of the turbine wheel assemblies 1440. The blades 1442 are in turn pushed by the combustion products to cause the turbine wheel assembly 1440 to rotate; thereby, driving the rotating components of the compressor 14 and/or the fan 12.

The blade track 1420 extends around the turbine wheel assembly 1440 to block combustion products from passing over the blades 1442 without pushing the blades 1442 to rotate as suggested in FIG. 18. The blade track 1420 includes a plurality of blade track segments 1422 that cooperate to form a ring. The blade track segments 1422 are each shaped to extend part-way around the central axis A and comprise ceramic-matrix composite materials. Each blade track segment 1422 is illustratively made from silicon-carbide, silicon-carbide ceramic-matrix composite, but may be made from oxide, oxide ceramic-matrix composite or the like.

Figure 19:
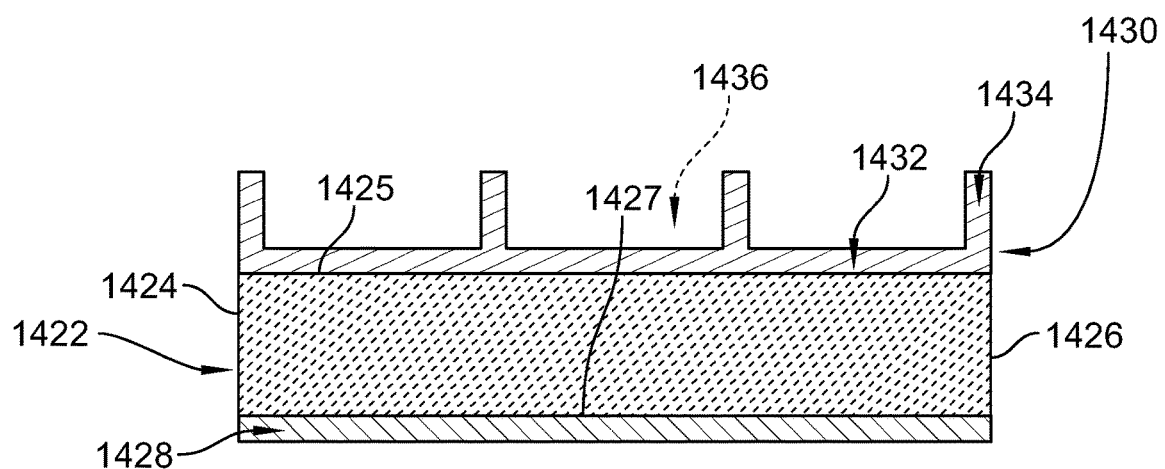
FIG. 19 is a sectional view of the track biaser of FIG. 18 taken along line 19-19 showing that the track biaser includes a metallic ring engaged with a radially outer surface of the blade track segments to provide a radially inward force that holds the blade track segments together and a plurality of fins extending radially outward from the ring to define cooling channels.

Each of the blade track segments 1422 includes opposing circumferential end faces 1421, 1423 and a radially outer surface 1425 extending between the end faces 1421, 1423 as shown in FIGS. 18 and 19. An abradable layer 1428 may be applied to a radially-inward face 1427 of the blade track segments 1422. The blade track segments 1422 are positioned circumferentially around the central axis A to form a substantially continuous ring and the track biaser 1430 is positioned to engage the outer surfaces 1425 of the blade track segments 1422 to maintain the shape of the blade track 1420.

In the illustrative embodiment, the track biaser 1430 includes a metallic ring 1432 positioned to surround the blade track 1420 and a plurality of fins 1434 extending radially outward from the ring 1432 to define cooling channels 1436 as shown in FIGS. 18 and 19. The ring 1432 is sized to engage with the outer surfaces 1425 of the blade track segments 1422. The cooling channels 1436 are positioned to receive cooling air for cooling the ring 1432 and blade track 1420. The fins 1434 provide additional stiffness to the ring 1432.

In the illustrative embodiment, the ring 1432 extends between axially-forward faces 1424 and axially-aft faces 1426 of the blade track segments 1422 as shown in FIG. 19. In some embodiments, the ring 1432 is press-fit onto the assembled blade track 1420. In other embodiments, the ring 1432 is heated to expand the ring 1432, positioned around the blade track 1420, and subsequently cooled to engage the blade track segments 1422.

The end faces 1421, 1423 of the blade track segments 1422 extend radially inward from the outer surface 1425 and are positioned to lie in a plane defined in part by the central axis A as suggested in FIG. 18. The track biaser 1430 is configured to provide a radially-inward force toward the central axis A against the blade track segments 1422. The end faces 1421, 1423 of adjacent blade track segments 1422 engage with one another to provide an opposing radially-outward force away from the central axis A and against the track biaser 1430. As such, each blade track segment 1422 acts as a keystone for circumferentially-adjacent blade track segments 1422 to maintain the form of the blade track 1420. The track biaser 1430 maintains alignment of the blade track segments 1422 in the ring.

Radially-inward loads placed on the blade track 1420 are distributed through the blade track segments 1422 as compressive hoop load as suggested in FIG. 18. Radially-outward loads placed on the blade track 1420 are distributed through the ring 1432 as tensile hoop load. In some embodiments, engagement between the end faces 1421, 1423 forms a seal between adjacent blade track segments 1422. In some embodiments, the blade track segments 1422 are integrally joined through co-processing, welding, or brazing, for example, to form a seal between adjacent blade track segments 1422. In some embodiments, the end faces 1421, 1423 come out of contact with one another as the temperature within the gas turbine engine 10 increases.

In the illustrative embodiment, the amount of cooling air supplied to the cooling channels 1436 is controlled to control the amount of thermal expansion of the ring 1432. As such, fluctuation of an inner diameter of the ring 1432 is controlled. Similarly, a tip clearance between the blades 1442 and the blade track segments 1422 may also be controlled by controlling the amount of cooling air supplied. The track biaser 1430 optionally includes cross-key locating features to align the blade track 1420 relative to the turbine wheel assembly 1440, for example via the outer case of the gas turbine engine 10. Axial seals used to separate the flow path around the blades 1442 from an environment radially outward of the blade track 1420 may engage with the track biaser 1430.

Figure 20:
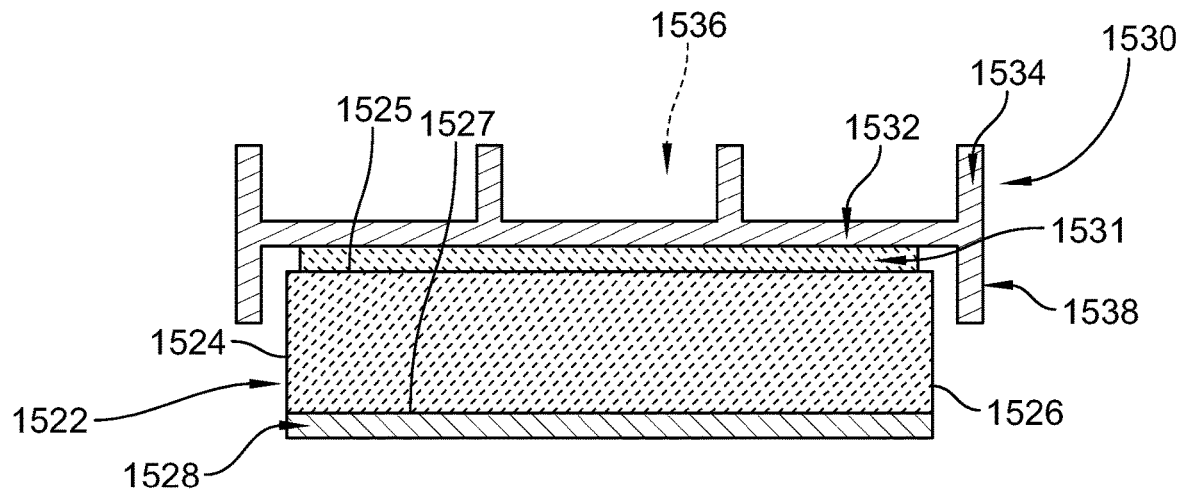
FIG. 20 is a view similar to FIG. 19 showing that another embodiment of a track biaser in accordance with the present disclosure includes a metallic ring engaged with an insulator layer coupled to a radially outer surface of the blade track segments to provide a radially inward force that holds the blade track segments together and a plurality of fins extending radially outward from the ring to define cooling channels.

In another embodiment, a track biaser 1530 includes a metallic ring 1532 and a plurality of fins 1534 extending radially outward from the ring 1532 to define cooling channels 1536 as shown in FIG. 20. The ring 1532 is sized to surround an assembled blade track formed from a plurality of circumferentially aligned blade track segments 1522. The cooling channels 1536 are positioned to receive cooling air for cooling the ring 1532 and blade track segments 1522.

In the illustrative embodiment, the ring 1532 extends beyond axially-forward faces 1524 and axially-aft faces 1526 of the blade track segments 1522 as shown in FIG. 20. A pair of flanges 1538 extend radially inward from the ring 1532 and are configured to restrict axial movement of the blade track segments 1522 relative to the track biaser 1530. The flanges 1538 may include circumferentially spaced slots. In some embodiments, the blade track segments 1522 include an abradable layer 1528 coupled to a radially-inward face 1527.

In the illustrative embodiment, the blade track segments 1522 include a thermal barrier layer 1531 and the track biaser 1530 is configured to engage with the thermal barrier layer 1531 as shown in FIG. 20. In some embodiments, the thermal barrier layer 1531 is compliant to reduce resultant stresses and spread loads along the blade track segments 1522. In some embodiments, the thermal barrier layer 1531 comprises Mica or Mat Mount ceramic materials. The thermal barrier layer 1531 limits heat transfer to the track biaser 1530.

The track biaser 1530 is configured to provide a radially-inward force against the blade track segments 1522 as suggested in FIG. 20. Circumferential end faces of adjacent blade track segments 1522 engage with one another to provide an opposing radially-outward force against the track biaser 1530. As such, each blade track segment 1522 acts as a keystone for circumferentially-adjacent blade track segments 1522. The track biaser 1530 maintains alignment of the blade track segments 1522 in a ring. Each blade track segment 1522 is illustratively made from silicon-carbide, silicon-carbide ceramic-matrix composite, but may be made from oxide, oxide ceramic-matrix composite or the like.

Figure 21:
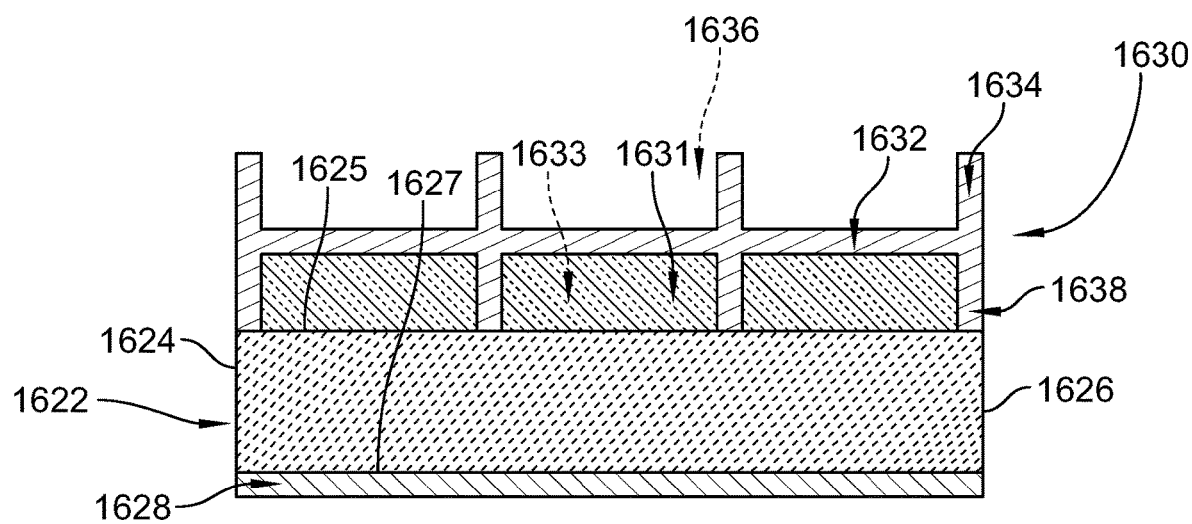
FIG. 21 is a view similar to FIG. 20 showing that another embodiment of a track biaser in accordance with the present disclosure includes a metallic ring, a plurality of insulator fins extending radially inward from the metallic ring to engage with the blade track segments to provide a radially inward force that holds the blade track segments together and define insulator channels to hold an insulative material therein, and a plurality of cooling fins extending radially outward from the ring to define cooling channels.

In another embodiment, a track biaser 1630 includes a metallic ring 1632, a plurality of outer fins 1634 extending radially outward from the ring 1632, and a plurality of inner fins 1638 extending radially inward from the ring 1632 as shown in FIG. 21. The outer fins 1634 define cooling channels 1636 and the inner fins 1638 define insulation-receiving channels 1633. The ring 1632 is sized to surround an assembled blade track formed from a plurality of circumferentially aligned blade track segments 1622.

The inner fins 1638 are configured to engage with outer surfaces 1625 of the blade track segments 1622 as shown in FIG. 21. An insulative material 1631 is positioned in the insulation-receiving channels 1633 and trapped between the ring 1632 and blade track segments 1622. In some embodiments, the insulative material 1631 comprises an aerogel or Mat Mount material which is optionally compressed. The inner fins 1638 may include circumferentially spaced slots or other features to manage thermal gradients, peak temperatures, and stresses within the blade track segments 1622 and ring 1632. In some embodiments, insulation-receiving channels are formed into the outer surface 1625 of the blade track segments 1622. The cooling channels 1636 of the track biaser 1630 are positioned to receive cooling air for cooling the ring 1632 and blade track segments 1622. In some embodiments, the blade track segments 1622 include an abradable layer 1628 coupled to a radially-inward face 1627.

In the illustrative embodiment, the ring 1632 extends between axially-forward faces 1624 and axially-aft faces 1626 of the blade track segments 1622 as shown in FIG. 21. The track biaser 1630 is configured to provide a radially-inward force against the blade track segments 1622. Circumferential end faces of adjacent blade track segments 1622 engage with one another to provide an opposing radially-outward force against the track biaser 1630. As such, each blade track segment 1622 acts as a keystone for circumferentially-adjacent blade track segments 1622. The track biaser 1630 maintains alignment of the blade track segments 1622 in a ring. Each blade track segment 1622 is illustratively made from silicon-carbide, silicon-carbide ceramic-matrix composite, but may be made from oxide, oxide ceramic-matrix composite or the like.

In another embodiment, the turbine 18 of the gas turbine engine 10 includes at least one turbine wheel assembly 1740, a blade track 1720 positioned to surround the turbine wheel assembly 1740, and a track biaser 1730 as shown in FIG. 22. The turbine wheel assembly 1740 includes a plurality of blades 1742 coupled to a rotor disk 1744 for rotation therewith. The hot, high pressure combustion products from the combustor 16 are directed toward the blades 1742 of the turbine wheel assemblies 1740. The blades 1742 are in turn pushed by the combustion products to cause the turbine wheel assembly 1740 to rotate; thereby, driving the rotating components of the compressor 14 and/or the fan 12.

The blade track 1720 extends around the turbine wheel assembly 1740 to block combustion products from passing over the blades 1742 without pushing the blades 1742 to rotate as suggested in FIG. 22. The blade track 1720 includes a plurality of blade track segments 1722 that cooperate to form a ring. The blade track segments 1722 are each shaped to extend part-way around the central axis A and comprise ceramic-matrix composite materials. Each blade track segment 1722 is illustratively made from silicon-carbide, silicon-carbide ceramic-matrix composite, but may be made from oxide, oxide ceramic-matrix composite or the like.

Each of the blade track segments 1722 includes opposing circumferential end faces 1721, 1723 and a radially outer surface 1725 extending between the end faces 1721, 1723 as shown in FIGS. 12 and 13. An abradable layer 1728 may be applied to a radially-inward face 1727 of the blade track segments 1722. The blade track segments 1722 are positioned circumferentially around the central axis A to form a substantially continuous ring and the track biaser 1730 is positioned to engage the outer surfaces 1725 of the blade track segments 1722 to maintain the shape of the blade track 1720.

In the illustrative embodiment, the track biaser 1730 includes a metallic band 1732 positioned to surround the blade track 1720 and a pin 1734 coupling ends 1736, 1738 of the band 1732 together as shown in FIGS. 22 and 23. The band 1732 is sized to engage with the outer surfaces 1725 of the blade track segments 1722. In the illustrative embodiment, the end 1738 of the band 1732 is positioned over a recess 1731 formed in one of the blade track segments 1722. The band 1732 extends around the blade track 1720 such that the end 1736 is positioned over the end 1738 as shown in FIG. 23. The pin 1734 extends through the ends 1736, 1738 of the band 1732 to couple the ends 1736, 1738 together. In some embodiments, the end 1738 is positioned over the end 1736. The pin 1734 extends into the recess 1731 to maintain circumferential alignment of the track biaser 1730 with the blade track 1720.

In some embodiments, the band 1732 comprises silicon-carbide, silicon-carbide ceramic-matrix composite, but may be made from oxide, oxide ceramic-matrix composite or the like. In such an embodiment, the band 1732 is formed such that an inner diameter of the band 1732 substantially matches an outer diameter of the outer surfaces 1725 of the blade track segments 1722. Ceramic fibers used in the ceramic-matrix composite of the band 1732 may extend along a length of the band 1732 and wrap around the pin 1734. The pin 1734 may also comprise ceramic-matrix composite material. For example, ceramic fibers may be braided into a tube and solidified into a ceramic-matrix composite structure.

The end faces 1721, 1723 of the blade track segments 1722 extend radially inward from the outer surface 1725 and are positioned to lie in a plane defined in part by the central axis A as suggested in FIG. 22. The track biaser 1730 is configured to provide a radially-inward force toward the central axis A against the blade track segments 1722. The end faces 1721, 1723 of adjacent blade track segments 1722 engage with one another to provide an opposing radially-outward force away from the central axis A and against the track biaser 1730. As such, each blade track segment 1722 acts as a keystone for circumferentially-adjacent blade track segments 1722 to maintain the form of the blade track 1720. The track biaser 1730 maintains alignment of the blade track segments 1722 in the ring.

Radially-inward loads placed on the blade track 1720 are distributed through the blade track segments 1722 as compressive hoop load as suggested in FIG. 22. Radially-outward loads placed on the blade track 1720 are distributed through the band 1732 as tensile hoop load. In some embodiments, engagement between the end faces 1721, 1723 forms a seal between adjacent blade track segments 1722. In some embodiments, the blade track segments 1722 are integrally joined through co-processing, welding, or brazing, for example, to form a seal between adjacent blade track segments 1722.

In another embodiment, a blade track 1820 formed from a plurality of blade track segments 1822 is positioned to surround a turbine wheel assembly 1840 as suggested in FIG. 24. The turbine wheel assembly 1840 includes a plurality of blades 1842 coupled to a rotor disk 1844 for rotation therewith. In some embodiments, the blade track segments 1822 include an abradable layer 1828 coupled to a radially-inward face 1827.

A track biaser 1830 includes a metallic band 1832 positioned to surround the blade track 1820 and a pin 1834 coupling ends 1836, 1838 of the band 1832 together as shown in FIG. 24. The band 1832 is sized to engage with outer surfaces 1825 of the blade track segments 1822. In the illustrative embodiment, the end 1836 is formed to include a tab 1835 and the end 1838 is formed to include a slot 1833 sized to receive the tab 1835.

The end 1838 of the band 1832 is positioned over a recess 1831 formed in one of the blade track segments 1822 as shown in FIG. 24. The band 1832 extends around the blade track 1820 such that the tab 1835 of the end 1836 fits into the slot 1833 of the end 1838. The pin 1834 extends through the ends 1836, 1838 of the band 1832 to couple the ends 1836, 1838 together. The pin 1834 extends into the recess 1831 to maintain circumferential alignment of the track biaser 1830 with the blade track 1820.

In some embodiments, the band 1832 comprises silicon-carbide, silicon-carbide ceramic-matrix composite, but may be made from oxide, oxide ceramic-matrix composite or the like. In such an embodiment, the band 1832 is formed such that an inner diameter of the band 1832 substantially matches an outer diameter of the outer surfaces 1825 of the blade track segments 1822. Ceramic fibers used in the ceramic-matrix composite of the band 1832 may extend along a length of the band 1832 and wrap around the pin 1834. The pin 1834 may also comprise ceramic-matrix composite material. For example, ceramic fibers may be braided into a tube and solidified into a ceramic-matrix composite structure.

The band 1832 engages with the outer surfaces 1825 to provide a radially-inward force against the blade track segments 1822 as suggested in FIG. 24. Circumferential end faces 1821, 1823 of adjacent blade track segments 1822 engage with one another to provide an opposing radially-outward force against the track biaser 1830. As such, each blade track segment 1822 acts as a keystone for circumferentially-adjacent blade track segments 1822. The track biaser 1830 maintains alignment of the blade track segments 1822 in a ring. Each blade track segment 1822 is illustratively made from silicon-carbide, silicon-carbide ceramic-matrix composite, but may be made from oxide, oxide ceramic-matrix composite or the like.

Figure 25:
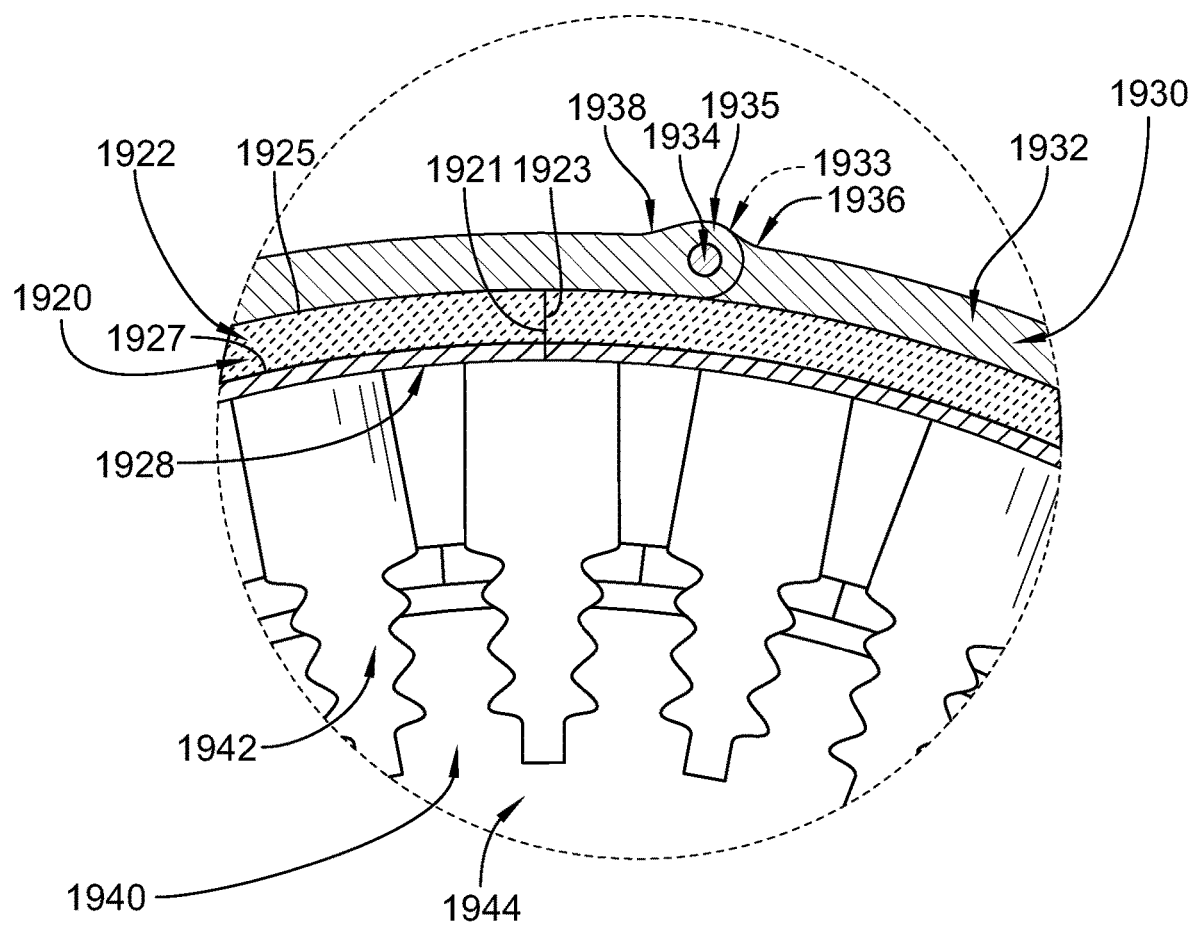
FIG. 25 is a view similar to FIG. 24 showing that another embodiment of a track biaser in accordance with the present disclosure includes a metallic band positioned to surround the blade track segments and an axially-extending pin coupled between fitted, opposing ends of the band and suggesting that the band engages with a radially outer surface of the blade track segments to provide a radially inward force that holds the blade track segments together.

In another embodiment, a blade track 1920 formed from a plurality of blade track segments 1922 is positioned to surround a turbine wheel assembly 1940 as suggested in FIG. 25. The turbine wheel assembly 1940 includes a plurality of blades 1942 coupled to a rotor disk 1944 for rotation therewith. In some embodiments, the blade track segments 1922 include an abradable layer 1928 coupled to a radially-inward face 1927.

Figure 26:
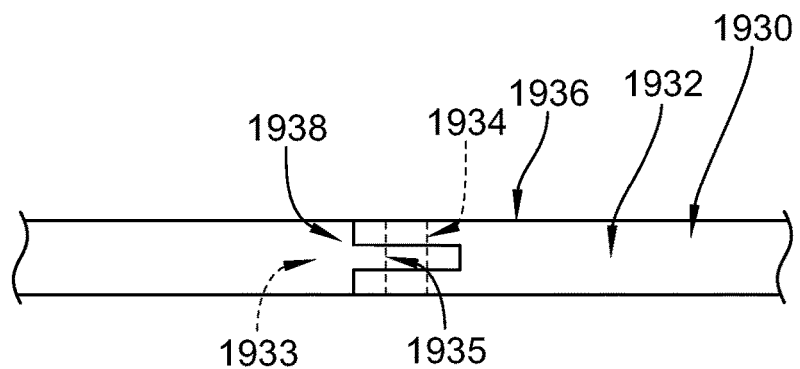
FIG. 26 is a top plan view of the band of FIG. 25 showing that one end of the band is formed to include a tab and the other end is formed to include a slot sized to receive the tab.

A track biaser 1930 includes a metallic band 1932 positioned to surround the blade track 1920 and a pin 1934 coupling ends 1936, 1938 of the band 1932 together as shown in FIGS. 25 and 26. The band 1932 is sized to engage with outer surfaces 1925 of the blade track segments 1922 as suggested in FIG. 25. In the illustrative embodiment, the end 1938 is formed to include a tab 1935 and the end 1936 is formed to include a slot 1933 sized to receive the tab 1835 as shown in FIG. 26. The band 1932 extends around the blade track 1920 such that the tab 1935 of the end 1938 fits into the slot 1933 of the end 1936 as shown in FIGS. 25 and 26. The pin 1934 extends through the ends 1936, 1938 of the band 1932 to couple the ends 1936, 1938 together. Although one band 1932 is shown, multiple bands 1932 and pins 1934 may be used.

In some embodiments, the band 1932 comprises silicon-carbide, silicon-carbide ceramic-matrix composite, but may be made from oxide, oxide ceramic-matrix composite or the like. In such an embodiment, the band 1932 is formed such that an inner diameter of the band 1932 substantially matches an outer diameter of the outer surfaces 1925 of the blade track segments 1922. Ceramic fibers used in the ceramic-matrix composite of the band 1932 may extend along a length of the band 1932 and wrap around the pin 1934. The pin 1934 may also comprise ceramic-matrix composite material. For example, ceramic fibers may be braided into a tube and solidified into a ceramic-matrix composite structure. In some embodiments, the ends 1936, 1938 of the band 1932 are spaced apart from one another and a spring-biased tensioning device is coupled between the ends 1936, 1938 to tighten the band 1932 on the blade track 1920.

The band 1932 engages with the outer surfaces 1925 to provide a radially-inward force against the blade track segments 1922 as suggested in FIG. 25. Circumferential end faces 1921, 1923 of adjacent blade track segments 1922 engage with one another to provide an opposing radially-outward force against the track biaser 1930. As such, each blade track segment 1922 acts as a keystone for circumferentially-adjacent blade track segments 1922. The track biaser 1930 maintains alignment of the blade track segments 1922 in a ring. Each blade track segment 1922 is illustratively made from silicon-carbide, silicon-carbide ceramic-matrix composite, but may be made from oxide, oxide ceramic-matrix composite or the like.

Figure 27:
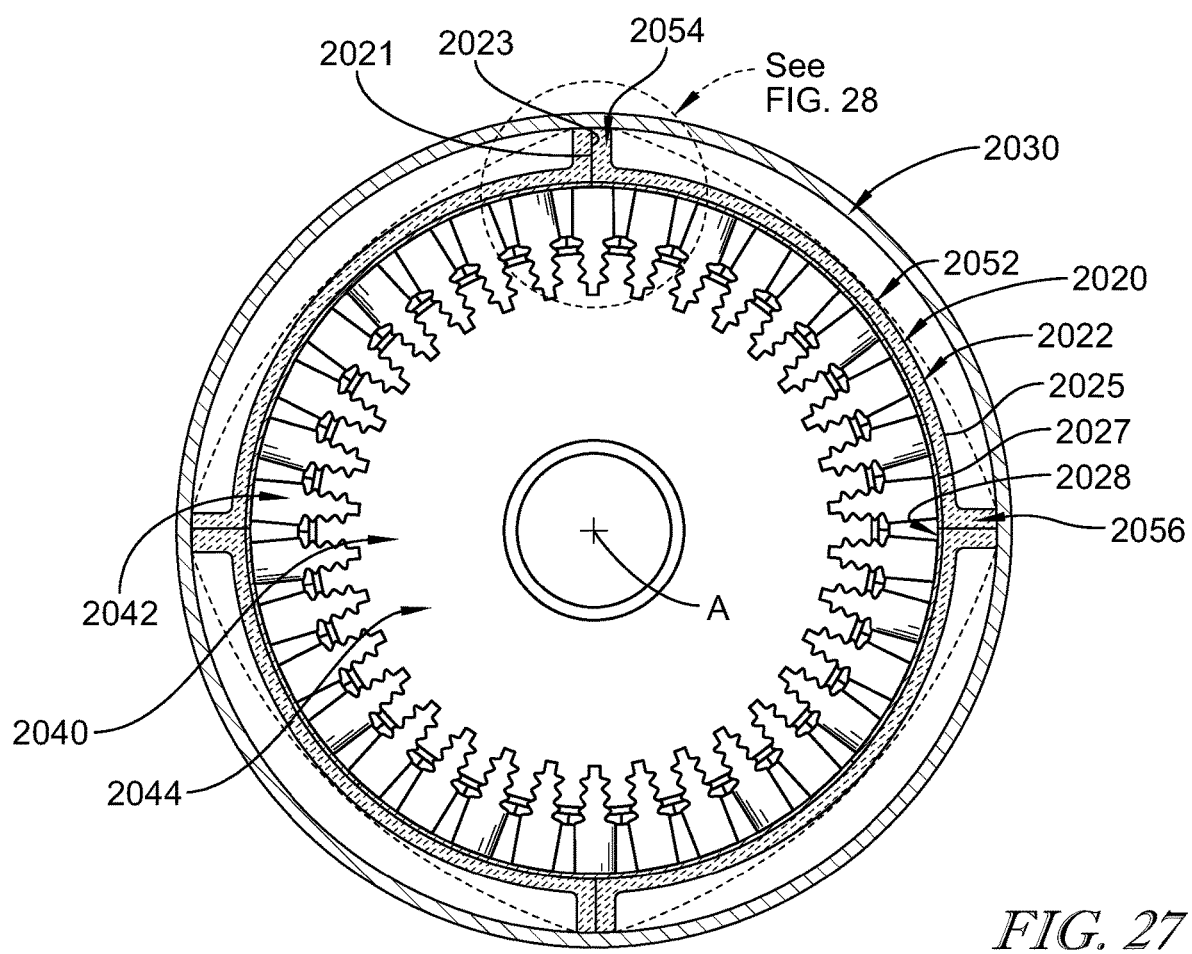
FIG. 27 is a view similar to FIG. 12 showing another embodiment of a track biaser in accordance with the present disclosure positioned to surround a plurality of blade track segments having a runner and a pair of radially-outward extending flanges coupled to circumferential ends of the runner.

In another embodiment, the turbine 18 of the gas turbine engine 10 includes at least one turbine wheel assembly 2040, a blade track 2020 positioned to surround the turbine wheel assembly 2040, and a track biaser 2030 as shown in FIG. 27. The turbine wheel assembly 2040 includes a plurality of blades 2042 coupled to a rotor disk 2044 for rotation therewith. The hot, high pressure combustion products from the combustor 16 are directed toward the blades 2042 of the turbine wheel assemblies 2040. The blades 2042 are in turn pushed by the combustion products to cause the turbine wheel assembly 2040 to rotate; thereby, driving the rotating components of the compressor 14 and/or the fan 12.

The blade track 2020 extends around the turbine wheel assembly 2040 to block combustion products from passing over the blades 2042 without pushing the blades 2042 to rotate as suggested in FIG. 27. The blade track 2020 includes a plurality of blade track segments 2022 that cooperate to form a ring. The blade track segments 2022 are each shaped to extend part-way around the central axis A and comprise ceramic-matrix composite materials. Each blade track segment 2022 is illustratively made from silicon-carbide, silicon-carbide ceramic-matrix composite, but may be made from oxide, oxide ceramic-matrix composite or the like.

Figure 28:
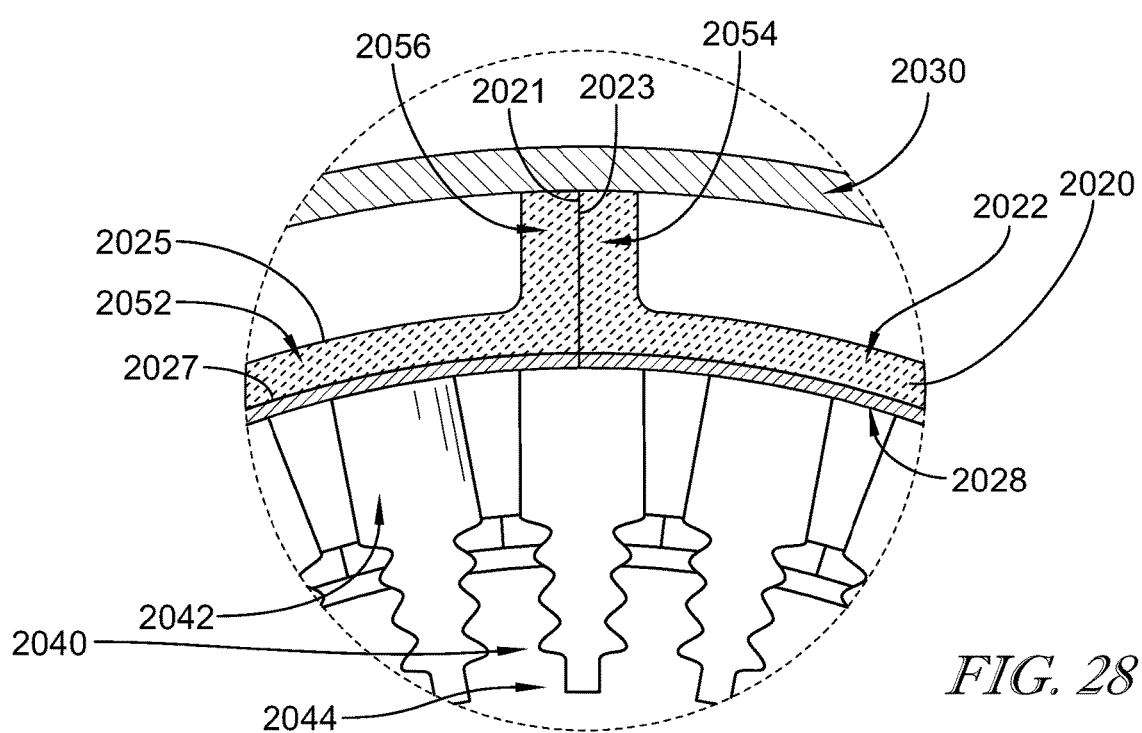
FIG. 28 is a detail view of the track-biaser system of FIG. 27 showing that the track biaser is positioned to engage the flanges of the blade track segments to bias the blade track segments radially inward and suggesting that circumferential end faces defined by the flanges engage with one another to keystone against one another.

Each of the blade track segments 2022 includes a runner 2052 along which the blades 2042 of the turbine wheel assembly 2040 move and a pair of flanges 2054, 2056 that extend from the runner 2052 as shown in FIG. 28. The flanges 2054, 2056 illustratively extend radially outward from an outer surface 2025 of the runner 2052. The flanges 2054, 2056 define opposing circumferential end faces 2021, 2023 of the blade track segment 2022. An abradable layer 2028 may be applied to a radially-inward face 2027 of the blade track segments 2022.

The blade track segments 2022 are positioned circumferentially around the central axis A to form a substantially continuous ring as shown in FIG. 27. The track biaser 2030 is positioned to engage the flanges 2054, 2056 of the blade track segments 2022 to maintain the shape of the blade track 2020. Contact between the track biaser 2030 and blade track 2020 is thereby minimized to minimize heat transfer and possible contamination transfer to the track biaser 2030. In the illustrative embodiment, the track biaser 2030 comprises a metallic ring positioned to surround the blade track 2020 as suggested in FIGS. 27 and 28. In some embodiments, the track biaser 2030 includes a plurality of segments joined together. In some embodiments, multiple track biasers 2030 may be used.

The track biaser 2030 is configured to provide a radially-inward force toward the central axis A against the blade track segments 2022 as suggested in FIG. 27. As the temperature within the engine 10 changes, the track biaser 2030 may expand more than the blade track 2020 due to differentials in coefficients of thermal expansion between the track biaser 2030 and blade track 2020. In the illustrative embodiment, the track biaser 2030 is heated to expand the track biaser 2030, positioned around the blade track 2020, and subsequently cooled to engage the flanges 2054, 2056 of the blade track segments 2022. Upon cooling, the track biaser 2030 may be configured to flex as suggested by the phantom line in FIG. 27. The track biaser 2030 may optionally contact the outer surfaces 2025 of the runners 2052 depending on a height of the flanges 2054, 2056 and flexibility of the track biaser 2030. In such an embodiment, the radially-inward force provided by the track biaser 2030 may increase by a step upon contact with the runner 2052. During heating, the track biaser 2030 flexes outward, from the phantom line position to the position shown in FIG. 27, in order to maintain contact with the flanges 2054, 2056.

The relative expansion and contact between the track biaser 2030 and blade track 2020 can be controlled to control the magnitude of the radially-inward force on the flanges 2054, 2056 at different operating temperatures. For example, at lower temperatures (such as at cold build or idle) where material allowables are higher, when the track biaser 2030 has not grown significantly compared to the blade track 2020, the blade track 2020 could contact the runner 2052 providing a greater load to hold the blade track segments 2022 together. At higher temperature operating points (such as at takeoff or cruise) the track biaser 2030 could outgrow the blade track 2020, lessening the load and resulting in no contact between the flange ends. This reduces the interference loads and stresses at high temperature operating points where material allowables are lower.

The end faces 2021, 2023 of the blade track segments 2022 extend radially inward from the outer surface 2025 and are positioned to lie in a plane defined in part by the central axis A as suggested in FIG. 27. The end faces 2021, 2023 of adjacent blade track segments 2022 engage with one another to provide an opposing radially-outward force away from the central axis A and against the track biaser 2030. As such, each blade track segment 2022 acts as a keystone for circumferentially-adjacent blade track segments 2022 to maintain the form of the blade track 2020. In some embodiments, ceramic fibers within the ceramic-matrix composite structure of the flanges 2054, 2056 are aligned parallel with the end faces 2021, 2023. The track biaser 2030 maintains alignment of the blade track segments 2022 in the ring.

Radially-inward loads placed on the blade track 2020 are distributed through the blade track segments 2022 as compressive hoop load as suggested in FIG. 27. Radially-outward loads placed on the blade track 2020 are distributed through the track biaser 2030 as tensile hoop load. In some embodiments, engagement between the end faces 2021, 2023 forms a seal between adjacent blade track segments 2022. In some embodiments, the blade track segments 2022 are integrally joined through co-processing, welding, or brazing, for example, to form a seal between adjacent blade track segments 2022.

Figure 29:
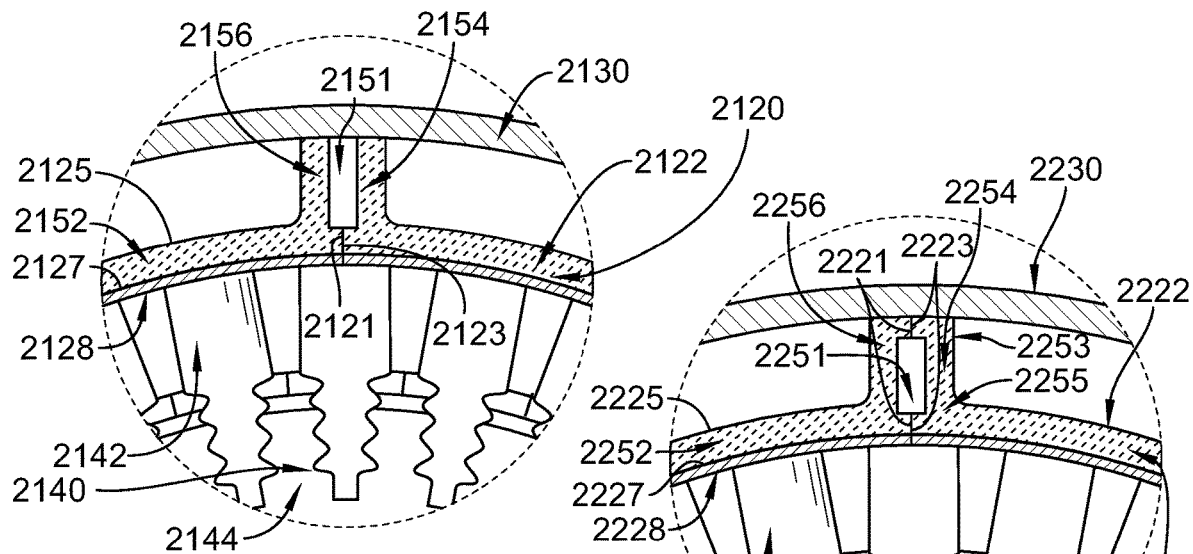
FIG. 29 is a view similar to FIG. 28 showing another embodiment of a track biaser in accordance with the present disclosure positioned to surround blade track segments having a runner and a pair of radially-outward extending flanges coupled to a radially outer surface of the runner and spaced apart from circumferential ends of the runner and suggesting that the track biaser engages with the flanges to provide a radially inward force that holds the blade track segments together.

In another embodiment, a blade track 2120 formed from a plurality of blade track segments 2122 is positioned to surround a turbine wheel assembly 2140 as suggested in FIG. 29. The turbine wheel assembly 2140 includes a plurality of blades 2142 coupled to a rotor disk 2144 for rotation therewith. In the illustrative embodiment, a track biaser 2130 comprises a metallic ring positioned to surround the blade track 2120.

Each of the blade track segments 2122 includes a runner 2152 along which the blades 2142 of the turbine wheel assembly 2140 move and a pair of flanges 2154, 2156 that extend from the runner 2152 as shown in FIG. 29. The flanges 2154, 2156 illustratively extend radially outward from an outer surface 2125 of the runner 2152 and are spaced apart from opposing circumferential end faces 2121, 2123 of the blade track segments 2122. In some embodiments, the blade track segments 2122 include an abradable layer 2128 coupled to a radially-inward face 2127.

The track biaser 2130 is positioned to engage the flanges 2154, 2156 of the blade track segments 2122 to maintain the shape of the blade track 2120 as suggested in FIG. 29. The track biaser 2130 engages with the flanges 2154, 2156 to provide a radially-inward force against the blade track segments 2122. The circumferential end faces 2121, 2123 of adjacent blade track segments 2122 engage with one another to provide an opposing radially-outward force against the track biaser 2130. As such, each blade track segment 2122 acts as a keystone for circumferentially-adjacent blade track segments 2122. Each blade track segment 2122 is illustratively made from silicon-carbide, silicon-carbide ceramic-matrix composite, but may be made from oxide, oxide ceramic-matrix composite or the like.

Figure 30:
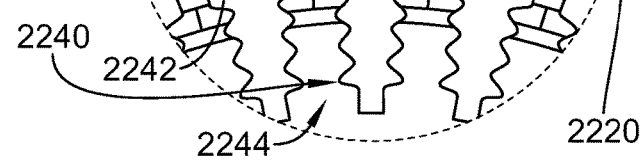
FIG. 30 is a view similar to FIG. 29 showing another embodiment of a track biaser in accordance with the present disclosure positioned to surround blade track segments having a runner and a pair of radially-outward extending flanges coupled to a radially outer surface of the runner and spaced apart from circumferential ends of the runner and suggesting that radially outer ends of the flanges of adjacent blade track segments engage one another.

In another embodiment, a blade track 2220 formed from a plurality of blade track segments 2222 is positioned to surround a turbine wheel assembly 2240 as suggested in FIG. 30. The turbine wheel assembly 2240 includes a plurality of blades 2242 coupled to a rotor disk 2244 for rotation therewith. In the illustrative embodiment, a track biaser 2230 comprises a metallic ring positioned to surround the blade track 2220.

Each of the blade track segments 2222 includes a runner 2252 along which the blades 2242 of the turbine wheel assembly 2240 move and a pair of flanges 2254, 2256 that extend from the runner 2252 as shown in FIG. 30. In some embodiments, the blade track segments 2222 include an abradable layer 2228 coupled to a radially-inward face 2227. The flanges 2254, 2256 illustratively extend radially outward from an outer surface 2225 of the runner 2252. Each of the flanges 2254, 2256 includes an inner end 2255 coupled to the runner 2252 and an outer end 2253 spaced radially outward from the inner end 2255.

The track biaser 2230 is positioned to engage the flanges 2254, 2256 of the blade track segments 2222 to maintain shape of the blade track 2220 as suggested in FIG. 30. The runner 2252 and outer ends 2253 of the flanges 2254, 2256 cooperate to define circumferential end faces 2221, 2223 of the blade track segments 2222. The track biaser 2230 engages with the flanges 2254, 2256 to provide a radially-inward force against the blade track segments 2222. The circumferential end faces 2221, 2223 of adjacent blade track segments 2222 engage with one another to provide an opposing radially-outward force against the track biaser 2230. As such, each blade track segment 2222 acts as a keystone for circumferentially-adjacent blade track segments 2222.

At least a portion of each flange 2254, 2256 is spaced apart from the end faces 2221, 2223 as suggested in FIG. 30. As such, an air gap 2251 is formed between adjacent blade track segments 2222 when the blade track 2220 is assembled. In some embodiments, the air gap 2251 is positioned to receive cooling air for cooling the blade track 2220. Each blade track segment 2222 is illustratively made from silicon-carbide, silicon-carbide ceramic-matrix composite, but may be made from oxide, oxide ceramic-matrix composite or the like.

Figure 31:
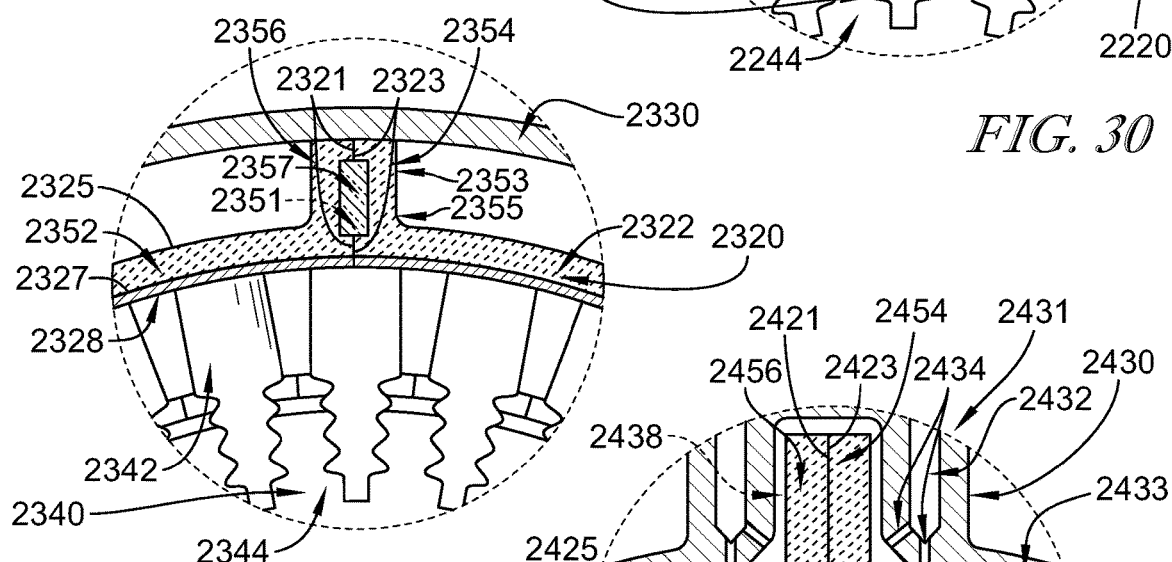
FIG. 31 is a view similar to FIG. 30 showing another embodiment of a track biaser in accordance with the present disclosure positioned to surround blade track segments having a runner and a pair of radially-outward extending flanges coupled to a radially outer surface of the runner and spaced apart from circumferential ends of the runner and suggesting that the flanges of adjacent blade track segments define a recess for holding an insulative material.

In another embodiment, a blade track 2320 formed from a plurality of blade track segments 2322 is positioned to surround a turbine wheel assembly 2340 as suggested in FIG. 31. The turbine wheel assembly 2340 includes a plurality of blades 2342 coupled to a rotor disk 2344 for rotation therewith. In the illustrative embodiment, a track biaser 2330 comprises a metallic ring positioned to surround the blade track 2320.

Each of the blade track segments 2322 includes a runner 2352 along which the blades 2342 of the turbine wheel assembly 2340 move and a pair of flanges 2354, 2356 that extend from the runner 2352 as shown in FIG. 31. In some embodiments, the blade track segments 2322 include an abradable layer 2328 coupled to a radially-inward face 2327. The flanges 2354, 2356 illustratively extend radially outward from an outer surface 2325 of the runner 2352. Each of the flanges 2354, 2356 includes an inner end 2355 coupled to the runner 1352 and an outer end 2353 spaced radially outward from the inner end 2355.

The track biaser 2330 is positioned to engage the flanges 2354, 2356 of the blade track segments 2322 to maintain the shape of the blade track 2320 as suggested in FIG. 31. The runner 2352 and outer ends 2353 of the flanges 2354, 2356 cooperate to define circumferential end faces 2321, 2323 of the blade track segments 2322. The track biaser 2330 engages with the flanges 2354, 2356 to provide a radially-inward force against the blade track segments 2322. The circumferential end faces 2321, 2323 of adjacent blade track segments 2322 engage with one another to provide an opposing radially-outward force against the track biaser 2330. As such, each blade track segment 2322 acts as a keystone for circumferentially-adjacent blade track segments 2322.

At least a portion of each flange 2354, 2356 is spaced apart from the end faces 2321, 2323 as suggested in FIG. 31. As such, an insulator receiver 2351 is formed between adjacent blade track segments 2322 when the blade track 2320 is assembled. An insulative material 2357 is positioned in the insulator receiver 2351. In some embodiments, the insulative material 2357 comprises an aerogel or Mat Mount material which is optionally compressed. Each blade track segment 2322 is illustratively made from silicon-carbide, silicon-carbide ceramic-matrix composite, but may be made from oxide, oxide ceramic-matrix composite or the like.

Figure 32:
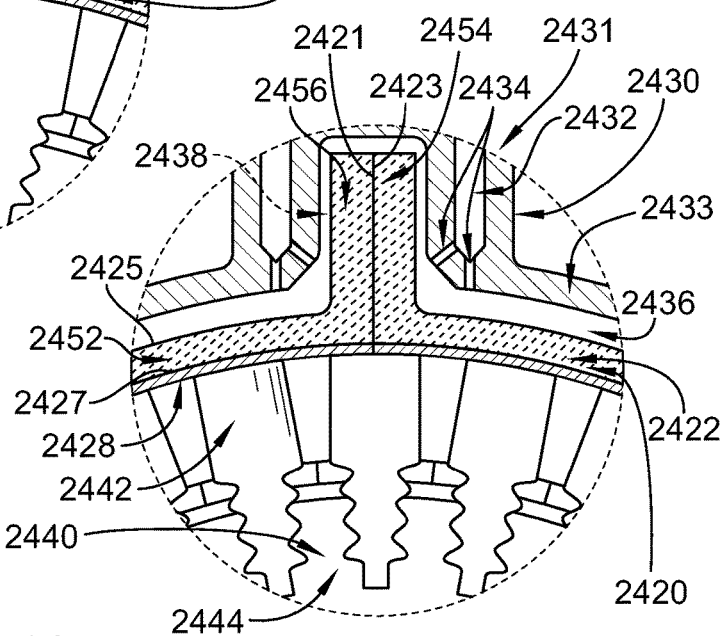
FIG. 32 is a partial sectional view of another embodiment of a track biaser in accordance with the present disclosure showing that the track biaser is positioned to surround a blade track formed from a plurality of blade track segments and includes a plurality of flow channels configured to pressurize a space between the blade track segments and the track biaser to provide a radially inward force that holds the blade track segments together.

In another embodiment, a blade track 2420 formed from a plurality of blade track segments 2422 is positioned to surround a turbine wheel assembly 2440 as suggested in FIG. 32. The turbine wheel assembly 2440 includes a plurality of blades 2442 coupled to a rotor disk 2444 for rotation therewith. In the illustrative embodiment, a track biaser 2430 is positioned to surround the blade track 2420.

Each of the blade track segments 2422 includes a runner 2452 along which the blades 2442 of the turbine wheel assembly 2440 move and a pair of flanges 2454, 2456 that extend from the runner 2452 as shown in FIG. 32. The flanges 2454, 2456 illustratively extend radially outward from an outer surface 2425 of the runner 2452. The flanges 2454, 2456 define opposing circumferential end faces 2421, 2423 of the blade track segment 2422. An abradable layer 2428 may be applied to a radially-inward face 2427 of the blade track segments 2422.

In the illustrative embodiment, the track biaser 2430 includes a plurality of ring segments 2433 coupled between a plurality of air-flow heads 2431 distributed circumferentially around the blade track 2420 as suggested in FIG. 32. The ring segments 2433 extend along and are radially spaced apart from the runners 2452 of the blade track segments 2422 to define an air gap 2436. The ring segments 2433 couple to the air-flow heads 2431 to form a continuous enclosure around the blade track 2420.

In the illustrative embodiment, each air-flow head 2431 is formed to include a recess 2438 sized to receive the flanges 2454, 2456 of an adjacent pair of blade track segments 2422 as suggested in FIG. 32. The flanges 2454, 2456 and recesses 2438 cooperate to cross-key the blade track 2420 relative to the track biaser 2430. The air-flow heads 2431 are also formed to include one or more cooling-air plenums 2432 and one or more holes 2434 in fluid communication with the cooling-air plenum 2432 and the air gap 2436. Cooling air flows from the cooling-air plenum 2432 through the holes 2434 and into the air gap 2436 to pressurize the space between the track biaser 1430 and blade track segments 2422. In some embodiments, the flanges 2454, 2456 and air-flow heads 2431 are aligned with hot spots of the combustor 16 so that the air-flow heads 2431 can provide additional localized cooling to the blade track 2420.

The pressure in the air gap 2436 provides a radially-inward force against the blade track segments 2422 as suggested in FIG. 32. The circumferential end faces 2421, 2423 of adjacent blade track segments 2422 engage with one another to provide an opposing radially-outward force against the pressure in the air gap 2436. As such, each blade track segment 2422 acts as a keystone for circumferentially-adjacent blade track segments 2422. Each blade track segment 2422 is illustratively made from silicon-carbide, silicon-carbide ceramic-matrix composite, but may be made from oxide, oxide ceramic-matrix composite or the like.

The present disclosure contemplates taking advantage of the high temperature capability of ceramic-matrix composites (CMC) to improve specific fuel consumption (SFC) with a full hoop CMC blade track. By eliminating the gaps between the blade track segments, the cooling and leakage air flow rates needed to cool the blade track are significantly reduced, thereby improving SFC.

Large full hoop blade tracks can be difficult to manufacture. First of all, it may require large processing equipment and in some cases this can require a different process as well. This may end up being costly because of the investment in larger equipment as well as development of a different process required by the new, larger processing equipment. Secondly, creating large diameter, thin walled parts may be difficult to do without distortion and out of roundness.

The present disclosure contemplates overcoming these difficulties by building a full hoop CMC blade track out of multiple segments, keystoned together, and held in place via a supporting hoop on their outer surface. Contact between the segments as they are forced together into a solid ring would provide a seal between the gas path and the cavity outboard of the ring of CMC segments. Integrally joining the ring of segments via co-processing, brazing, welding, etc. may further ensure sealing between segments. Alternatively, the blade track segments may be assembled together in a partially processed state, such as after chemical vapor infiltration (CVI), and receive final processing together, such as through a slurry or melt infiltration. As such, the blade track segments would be integrally joined, not allowing relative movement during operation of the engine.

The full hoop may be cross-keyed in place to mount it concentric to the centerline of the engine. Non-planar features between segments that would self locate the segments radially and/or axially to one another may be incorporated into the shown design without departing from the intended scope of the disclosure. Such features may be an assembly aid as well as a means to ensure parts do not slip relative to each other during operation of the engine.

The blade track segments may receive additional processing to meet design tolerances. For example, the inner surface (or flowpath face) may be machined for roundness and surface roughness to maximize SFC. The outer diameter of the blade track may be machined for roundness and surface roughness to provide a round seating surface for mating components and minimize stack up contributing to interference fit stresses.

The blade track and track biaser assemblies described herein are illustratively shown in a turbine of a gas turbine engine. However, these assemblies may be used in other portions of the engine without departing from the scope of the present disclosure. For example, a segmented blade track may be positioned in a compressor of the engine with a track biaser positioned to maintain the shape of the blade track. In another example, a segmented combustor liner, similar to the blade tracks described herein, may be positioned in a combustor of the engine with a liner biaser, similar to the track biasers described herein, positioned to maintain the shape of the combustor liner.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A blade track for a gas turbine engine, the blade track comprising
a plurality of blade track segments, each of the plurality of blade track segments shaped to extend circumferentially part-way around an axis, and the plurality of blade track segments being positioned circumferentially around the axis to form a ring, and
an annular hoop arranged circumferentially around the entire ring whereby the annular hoop applies a radially-inward force toward the axis against each of the plurality of blade track segments such that each of the plurality of blade track segments acts as a keystone to maintain a form of the ring,
wherein each of the plurality of blade track segments includes opposing circumferential end faces and a radially outer surface extending between the end faces and wherein the end faces of neighboring blade track segments are engaged with one another, and
wherein the annular hoop comprises an annular composite-lock structure positioned to engage the radially outer surface of each of the plurality of blade track segments.

2. The blade track of claim 1, wherein the annular composite-lock structure includes ceramic-matrix materials and at least one reinforcement fiber of ceramic-containing material suspended in the ceramic-matrix materials of the annular composite-lock structure and the annular composite-lock structure extends circumferentially around the entire ring to provide the radially-inward force toward the axis against each of the plurality of blade track segments such that each blade track segment acts as a keystone to maintain the form of the ring.

3. The blade track of claim 1, wherein each of the plurality of blade track segments includes a runner that defines a radially outer surface and a pair of flanges that extend radially outward from the radially outer surface of the runner to form a radially-outward opening channel with the runner that receives at least a portion of the annular hoop.

4. The blade track of claim 1, wherein each of the plurality of blade track segments comprises ceramic material.

5. The blade track of claim 4, further comprising a thermal barrier layer positioned radially between the plurality of blade track segments and the annular hoop.

6. The blade track of claim 4, wherein each of the plurality of the blade track segments include a runner that defines the radially outer surface and a pair of flanges that extend radially outward from the radially outer surface of the runner to form a radially-outward opening channel with the runner that receives at least a portion of the annular hoop.

7. The blade track of claim 1, wherein the opposing circumferential end faces included in each of the plurality of blade track segments includes a first circumferential end face and a second circumferential end face spaced apart circumferentially from the first circumferential end face, the first circumferential end face and the second circumferential end face of each of the plurality of blade track segments are planar, and the first circumferential end face and the second circumferential end face of each of the plurality of blade track segments lie in planes defined in part by the axis.

8. The blade track of claim 1, wherein each of the plurality of blade track segments comprise ceramic matrix composite materials.

9. The blade track of claim 1, further comprising a thermal barrier layer positioned entirely radially between the plurality of blade track segments and the annular hoop.

10. A blade track for a gas turbine engine, the blade track comprising
a plurality of blade track segments, each of the plurality of blade track segments shaped to extend circumferentially part-way around an axis, and the plurality of blade track segments being positioned circumferentially around the axis to form a ring,
an annular hoop arranged circumferentially around the entire ring whereby the annular hoop applies a radially-inward force toward the axis against each of the plurality of blade track segments such that each of the plurality of blade track segments acts as a keystone to maintain a form of the ring,
wherein each of the plurality of blade track segments comprises ceramic material, and
wherein the annular hoop comprises ceramic materials.

11. The blade track of claim 10, wherein the annular hoop comprises ceramic matrix composite materials.

12. The blade track of claim 10, wherein each of the plurality of blade track segments includes opposing circumferential end faces and a radially outer surface extending between the end faces and wherein the end faces of neighboring blade track segments of the plurality of blade track segments are engaged with one another.

13. The blade track of claim 12, wherein the annular hoop comprises an annular composite-lock structure positioned to engage the radially outer surface of each of the plurality of blade track segments.

14. The blade track of claim 13, wherein the annular composite-lock structure includes ceramic-matrix materials and at least one reinforcement fiber of ceramic-containing material suspended in the ceramic-matrix materials of the annular composite-lock structure and the annular composite-lock structure extends circumferentially around the entire ring.

15. The blade track of claim 10, further comprising a thermal barrier layer positioned radially between the plurality of blade track segments and the annular hoop.

16. A method of forming a blade track for use in a gas turbine engine, the method comprising forming a plurality of blade track segments, arranging the plurality of blade track segments around an axis to form a ring, forming an annular hoop, and positioning the annular hoop circumferentially around the ring to provide a radially inward force against the plurality of blade track segments such that each of the plurality of blade track segments acts as a keystone to maintain a form of the ring, wherein each of the plurality of blade track segments comprise ceramic-matrix composite materials, and wherein forming the annular hoop includes wrapping a single continuous fiber along radially outer surfaces of the plurality of blade track segments.

17. The method of claim 16, further comprising heating the annular hoop before positioning the annular hoop circumferentially around the ring.

18. The method of claim 17, wherein the annular hoop comprises metallic material and the entire annular hoop is located radially outward of the ring.

19. The method of claim 16, wherein each of the plurality of blade track segments comprise ceramic materials.

20. The method of claim 16, wherein positioning the annular hoop circumferentially around the ring includes press-fitting the annular hoop onto the ring.

* * * * *